United States Patent
Chen et al.

(10) Patent No.: US 10,532,667 B2
(45) Date of Patent: Jan. 14, 2020

(54) APPARATUS, SYSTEM, AND METHOD FOR VENDING, CHARGING, AND TWO-WAY DISTRIBUTION OF ELECTRICAL ENERGY STORAGE DEVICES

(71) Applicant: Gogoro Inc., Hong Kong (CN)

(72) Inventors: Jung-Hsiu Chen, Taoyuan (TW); Shen-Chi Chen, Bade (TW); Yu-Lin Wu, Chiayi (TW); Chien-Ming Huang, Taipei (TW); TsungTing Chan, Bade (TW); Feng Kai Yang, Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 16/056,291

(22) Filed: Aug. 6, 2018

(65) Prior Publication Data

US 2019/0168627 A1 Jun. 6, 2019

Related U.S. Application Data

(63) Continuation of application No. 14/842,467, filed on Sep. 1, 2015, now Pat. No. 10,040,359.
(Continued)

(51) Int. Cl.
*G07F 7/06* (2006.01)
*B60L 53/18* (2019.01)
(Continued)

(52) U.S. Cl.
CPC .............. *B60L 53/18* (2019.02); *B60L 53/305* (2019.02); *B60L 53/51* (2019.02); *B60L 53/65* (2019.02); *B60L 53/665* (2019.02); *B60L 53/80* (2019.02); *B60L 58/16* (2019.02); *B60L 58/26* (2019.02); *B60L 58/27* (2019.02); *B60S 5/06* (2013.01); *G07F 7/06* (2013.01); *G07F 15/006* (2013.01);
(Continued)

(58) Field of Classification Search
USPC ........................................................ 320/107
See application file for complete search history.

(56) References Cited

U.S. PATENT DOCUMENTS

| 2011/0140671 A1* | 6/2011 | Kim ........................ H02J 7/025 320/137 |
| 2013/0214732 A1* | 8/2013 | Nowottnick ....... G07C 9/00309 320/108 |

(Continued)

*Primary Examiner* — Mohammed Alam
(74) *Attorney, Agent, or Firm* — Perkins Coie LLP

(57) ABSTRACT

A two-way distribution, charging, and vending system permits a subscriber to exchange one or more partially or completely discharged portable electric energy storage devices for a comparable number of charged portable electric energy storage devices. The two-way distribution, charging, and vending system includes a number of charging modules, each with a dedicated power converter, communicably coupled to at least one two-way distribution system controller and to a power distribution grid. Upon receipt of a discharged portable electric energy storage device, the at least one two-way distribution system controller validates a manufacturer identifier and a subscriber identifier stored in a nontransitory storage media carried by the discharged portable electric energy storage device. Responsive to a successful authentication and validation, the at least one two-way distribution system controller dispenses a charged portable electric energy storage device to the subscriber.

20 Claims, 17 Drawing Sheets

Related U.S. Application Data

(60) Provisional application No. 62/045,982, filed on Sep. 4, 2014.

(51) Int. Cl.

| | | |
|---|---|---|
| *G07F 15/00* | (2006.01) | |
| *B60S 5/06* | (2019.01) | |
| *B60L 53/80* | (2019.01) | |
| *B60L 53/65* | (2019.01) | |
| *B60L 53/66* | (2019.01) | |
| *B60L 58/16* | (2019.01) | |
| *B60L 58/26* | (2019.01) | |
| *B60L 58/27* | (2019.01) | |
| *B60L 53/30* | (2019.01) | |
| *B60L 53/51* | (2019.01) | |

(52) U.S. Cl.
CPC ..... *B60L 2240/545* (2013.01); *B60L 2240/70* (2013.01); *B60L 2250/20* (2013.01); *B60L 2270/34* (2013.01); *Y02T 10/7005* (2013.01); *Y02T 10/705* (2013.01); *Y02T 10/7088* (2013.01); *Y02T 10/7291* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

2014/0136863 A1* 5/2014 Fritchman ............... G06F 1/26
  713/310
2016/0068075 A1* 3/2016 Chen ................... B60L 11/1822
  320/107

\* cited by examiner

APPARATUS, SYSTEM, AND METHOD FOR VENDING, CHARGING, AND TWO-WAY DISTRIBUTION OF ELECTRICAL ENERGY STORAGE DEVICES

CROSS REFERENCE TO RELATED APPLICATIONS

This application is a continuation of U.S. patent application Ser. No. 14/842,467 filed Sep. 1, 2015, now U.S. Pat. No. 10,040,359, and titles APPARATUS SYSTEM, AND METHOD FOR VENDING, CHARGING, AND TWO-WAY DISTRIBUTION OF ELECTRICAL ENERGY STORAGE DEVICES, which claims priority to and the benefit of U.S. Provisional Patent Application No. 62/045,982 filed Sep. 4, 2014, and titled APPARATUS, SYSTEM, and METHOD FOR VENDING, CHARGING, AND TWO-WAY DISTRIBUTION OF ELECTRICAL ENERGY STORAGE DEVICES, all of which are incorporated herein by reference in their entirety.

BACKGROUND

Technical Field

The present disclosure generally relates to the vending, charging, and two-way distribution of electrical energy storage devices.

Description of the Related Art

Electric powered vehicles are gaining in popularity worldwide. One of the primary impediments to widespread acceptance of electric or battery powered vehicles is the ready availability of charged portable electrical energy storage devices to avoid leaving drivers stranded for extended periods while recharging. This issue is particularly acute in regions and areas that are susceptible to interruptions in electrical distribution and/or delivery. Providing a readily available source of charged portable electric storage devices in a number of convenient locations may ameliorate the worries of many drivers and may foster the widespread acceptance of electric vehicles, particularly in highly congested urban areas. Adoption of electric vehicle technology on a widespread basis may assist in improving air quality in regions where vehicle and other minimally regulated mobile emission sources are prevalent.

BRIEF SUMMARY

The Applicants have advantageously developed a vehicle, e.g., scooter powered by modular portable electrical energy storage devices. A network of portable electric energy storage device two-way distribution, charging, and vending systems positioned throughout an area supports the vehicles by exchanging discharged or depleted portable electrical energy storage devices for charged portable electrical energy storage devices. By reducing the recharging process to a simple, "drop off a discharged battery and pick up a charged battery" concept, drivers receive a sense of reassurance similar to that provided by fossil fuel stations in fossil fueled vehicles. Each of the two-way distribution, charging, and vending systems may optionally provide additional services that improve or enhance the sense of value to drivers. For example, a two-way distribution, charging, and vending system may have ability to perform one or more diagnostic procedures on a vehicle and provide output to the driver indicative of the results of the diagnostic procedures.

In a typical example, a driver acquires a vehicle powered by one or more portable electrical energy storage devices and subscribes to a plan offered by the vehicle manufacturer or portable electrical energy storage device supplier that permits the two-way exchange of depleted or partially/completely discharged portable electrical energy storage devices at any two-way distribution, charging, and vending system within the manufacturer's network. Such two-way distribution, charging, and vending systems can be positioned at any point where electrical power and wired or wireless communications capabilities are available.

The two-way distribution, charging, and vending system includes at least one at least one two-way distribution system controller, a power distribution system, at least one communications interface, and a rigid structure that includes a number of receptacles or "buckets." Each of the buckets can accept a slideably insertable power converter module that converts power supplied by a power distribution system (e.g., public or private power grid, solar cell or other renewable energy sources) to a form and voltage suitable for charging a portable electric energy storage device. Each of the buckets can further accept the slideable insertion of a charging module which is electrically conductively coupled to and receives power from the modular power converter and is wiredly or wirelessly communicably coupled to the at least one two-way distribution system controller.

A subscriber inserts a partially or completely discharged portable electrical energy storage device into a first (empty) charging module in the two-way distribution, charging, and vending system. Upon receipt of the portable electrical energy storage device from the subscriber, the two-way distribution system controller authenticates the portable electrical energy storage device by reading a manufacturer identifier stored in a nontransitory storage media carried by the portable electric energy storage device. The controller also validates a subscriber identifier read from the nontransitory storage media carried by the portable electric energy storage device provided by the subscriber to confirm the subscription is current and to determine any services to which the subscriber may be entitled.

After authenticating the portable electrical energy storage device and validating the subscriber, the controller unlocks/releases one or more charged portable electrical energy storage devices from one or more second charging modules. The subscriber is able to remove the charged portable electrical energy storage device from the second charging module. The time required to perform such an exchange is minimal and is advantageously comparable to the time required to fill a conventional vehicle's fuel tank.

A number of charging modules are inserted into buckets in the two-way distribution, charging, and vending system. Each of the charging modules is equipped with one or more modular connectors or interfaces that communicably couple the charging module to the power distribution system (e.g., busses and laterals) upon seating within the bucket. Each of the charging modules is further equipped with at least one of a wired or a wireless communications module that autonomously wiredly or wirelessly communicably couples to the two-way distribution system controller upon seating the charging module into the bucket.

The modular design of the charging modules eliminates the need to field-service a malfunctioning charging module, a significant advantage in areas where inclement weather is common and access to electronic diagnostic tools is limited. Each charging module is electrically isolated from every other charging module in the two-way distribution, charging, and vending system, thus a failure of a single charging module does not adversely affect the operation of other charging modules or the two-way distribution, charging, and vending system as a whole. The two-way distribution, charging, and vending systems may include a modular construction that enables the modules to be physically, electrically, and communicably linked to form a two-way distribution, charging, and vending system having any number of charging modules. Such modular construction is advantageous to accommodate an increasing number of users in a minimally disruptive manner (i.e., two-way distribution, charging, and vending systems are not replaced, but are instead expanded to accommodate subscriber growth).

The charging module incorporates a displaceable housing door. Springs or other biasing members bias the displaceable housing door toward the entrance of the charging module. The displaceable housing door incorporates or seats against a weatherproof seal that limits or prevents the ingress of rainwater, dust, and dirt into the charging module. The act of inserting the portable electrical energy storage device displaces the housing door along a longitudinal axis of the charging module. An aperture on the housing door permits a locking hub in the base of the charging module to pass through the displaceable door and engage a complimentary cavity on the portable electrical energy storage device, securing the portable electrical energy storage device in the charging module. The aperture also permits the passage of a number of electrical contacts to engage a complimentary number of electrical contacts on the portable electrical energy storage device, thereby permitting the flow of current from the two-way distribution, charging, and vending system to the portable electrical energy storage device.

Upon insertion of a portable electrical energy storage device in a charging module, the two-way distribution system controller performs various diagnostic tests to confirm the utility and safety of the portable electrical energy storage device. For example, the two-way distribution, charging, and vending system may determine whether the recently received portable electrical energy storage device is able to hold an acceptable charge level. If the two-way distribution system controller determines an inserted portable electrical energy storage device is unsuitable for continued use, the two-way distribution system controller may lock the portable electrical energy storage device into the charging module.

The two-way distribution system controller may optionally communicate one or more messages via a wired (e.g., plain old telephone service or POTS) or wireless (e.g., GSM or CDMA cellular communication or IEEE 802.11 WiFi) communications interface to a back-end system. The two-way distribution system controller may also provide environmental control (e.g., cooling, heating, dehumidification) within individual charging modules and/or within individual portable electrical energy storage devices inserted into charging modules to ensure the portable electrical energy storage devices are maintained at an optimal temperature during the charging process.

A charging module to charge portable electric energy storage devices may be summarized as including a housing dimensioned to accommodate the at least partial insertion of a portable energy storage device along a longitudinal axis of the housing into an interior space formed by a peripheral housing wall joined to a base; a number of electric contacts projecting from the base at least partially into the interior space of the housing; a displaceable, (e.g., a rotatably displaceable), locking mechanism projecting from the base at least partially into the interior space of the housing; an entrance joined to the peripheral housing wall opposite the base, the entrance including an orifice connecting the interior space of the housing to an exterior space about the housing, the perimeter of the orifice closely corresponding to at least one physical aspect of the portable energy storage device casing; a housing door operably coupled to and positioned in the interior of the housing, the housing door axially displaceable along the longitudinal axis of the housing from a first position perpendicular to the housing wall and proximate the orifice to at least a second position perpendicular to the housing wall and proximate the base of the housing; an aperture concentric with the longitudinal axis of the housing through the housing door, the aperture to accommodate the passage of at least a portion of the locking mechanism and at least a portion of the number of electric contacts when the housing door is displaced to the second position; and at least one biasing element operably coupling the door to the base, the at least one biasing element biasing the housing door towards the first position.

The charging module may further include a displaceable cover disposed proximate the aperture and displaceable from a closed position in which the aperture is occluded, to an open position in which the aperture is unobstructed, the cover operably coupled to the housing door and to the housing such that as the housing door is displaced from the first position to the second position, the cover is displaced from the closed position to the open position.

The charging module may further include an actuator coupled to the locking mechanism, the actuator causing a displacement of the locking mechanism responsive to a receipt of the portable energy storage device casing in the interior space of the housing.

The charging module may further include a modular electrical interface electrically conductively coupled to the number of electric contacts projecting from the base of the housing into the interior space of the housing. Each of the number of electric contacts may be positioned concentric to the longitudinal axis of the housing and electrically isolated from any other of the number of electric contacts. Each of the number of electric contacts may include a circularly annular electric contact positioned concentric to the longitudinal axis of the housing and electrically isolated from any other of the number of electric contacts. Each of the number of electric contacts may include at least one of: a polygonally annular electric contact or a rounded polygonally annular electric contact, each electric contact positioned concentric to the longitudinal axis of the housing and electrically isolated from any other of the number of electric contacts. The number of electric contacts may form an electrically continuous circuit with a corresponding number of externally accessible electric contacts on the portable electric energy storage device casing when a portable electric energy storage device is inserted in the housing. The number of electric contacts may form an electrically continuous circuit with a corresponding number of electric contacts on an exterior surface of the portable energy storage device casing independent of the rotation of the portable energy storage device casing about the longitudinal axis of the housing. The locking mechanism may be positioned radially concentric to the number of electric contacts and is electrically isolated from the number of electric contacts. The displaceable cover may include a rotatably displaceable cover; and the rotatably displaceable cover may rotates from the closed position to the open position as the housing door is displaced from the first position to the second position.

The displaceable cover may include a slideably displaceable cover; and the slideably displaceable cover may slides from the closed position to the open position as the housing door is displaced from the first position to the second position. A central region of the housing door may include a depression symmetric about two orthogonal transverse axes, the two orthogonal transverse axes mutually orthogonal to the longitudinal axis of the housing, the depression corresponding to a projecting portion of the portable energy storage device casing.

The charging module may further include a portable electrical energy storage device thermal control system that includes: at least one input channel communicably coupled to at least one two-way distribution system controller, the at least one input channel to receive an input signal from a portable electrical energy storage device inserted in the respective housing, the input signal including digital data representative of an internal temperature of the portable electrical energy storage device inserted in the respective charging module; at least one output channel communicably coupled to the at least one two-way distribution system controller, the at least one output channel to provide an output signal to at least one of a temperature control subsystem or a temperature control device to maintain the internal temperature of the portable electrical energy storage device inserted in the respective charging module in a defined range at least while charging the portable electrical energy storage device.

A method of operating a portable electrical energy storage device charging and two-way distribution system may be summarized as including accepting the insertion of a first portable electrical energy storage device into a first of a number of charging modules, each of the number of charging modules bidirectionally communicably coupled to at least one two-way distribution system controller; reading data from one or more non-transitory storage media carried by the first portable electrical energy storage device via a communications interface communicably coupled to the at least one two-way distribution system controller; authenticating a first portion of the data read from the one or more non-transitory storage media carried by the portable electrical energy storage device, using the at least one two-way distribution system controller; validating a second portion of the data read from the one or more non-transitory storage media carried by the portable electrical energy storage device, using the at least one two-way distribution system controller; and responsive to successfully authenticating the first portion of the data and responsive to successfully validating the second portion of the data: writing the second portion of data read from the one or more non-transitory storage media carried by the first portable electrical energy storage device to one or more non-transitory storage media carried by a second portable electrical energy storage device inserted in a second of the number of charging modules, by the at least one two-way distribution system controller; and allowing the removal of the second portable electrical energy storage device from a second of the number of charging modules. Accepting the insertion of a first portable electrical energy storage device into a first of a number of charging modules may include accepting the at least partial insertion of the first portable electrical energy storage device into the first of the number of charging modules; locking the first portable electric energy storage device to the first of the number of charging modules by autonomously displacing a locking hub to a first (locked) position in which a portable electric energy storage device inserted into the first of the number of charging modules cannot be removed; and allowing the removal of the second portable electrical energy storage device from a second of the number of charging modules may include unlocking the second portable electric energy storage device from the second of the number of charging modules by autonomously displacing a locking hub to a second (unlocked) position in which a portable electric energy storage device can be removed from the second of the number of charging modules. Autonomously displacing the locking hub to a first (locked) position may include rotatably displacing the locking hub in the first of the number of charging modules from the first (locked) position as the first portable electrical energy storage device is inserted into the first of the number of charging modules; and autonomously rotatably returning the locking hub to the first (locked) position via one or more biasing members after the first portable electrical energy storage device is inserted into the first of the number of charging modules. Autonomously displacing the locking hub to a second (unlocked) position may include autonomously displacing an actuator from a first position to a second position, the displacement of the actuator from the first position to the second position sufficient to cause a corresponding displacement of the operably coupled locking hub in the second of the number of charging modules from the first (locked) position to the second (unlocked) position. Allowing the insertion of a first portable electrical energy storage device into a first of a number of charging modules may include accepting the at least partial insertion of the first portable electrical energy storage device into the first of the number of charging modules such that a perimeter of the first of the number of charging modules accommodates a perimeter of a casing disposed about the first portable electrical energy storage device regardless of an orientation of the casing about a longitudinal axis of the casing when the longitudinal axis of the casing and a longitudinal axis of the charging module are collinear.

The method may further include reading data indicative of one or more operational aspects of an external device powered by the first portable electrical energy storage device from the one or more non-transitory storage media carried by the first portable electrical energy storage device via the communications interface communicably coupled to the at least one two-way distribution system controller; generating data representative of a display output for presentation on one or more output devices communicably coupled to the at least one two-way distribution system controller; and erasing the data indicative of one or more operational aspects of the external device powered by the first portable electrical energy storage device from the one or more non-transitory storage media carried by the first portable electrical energy storage device via the communications interface communicably coupled to the at least one two-way distribution system controller. Validating a second portion of the data read from the one or more non-transitory storage media carried by the portable electrical energy storage device may include communicating the second portion of the data read from the one or more non-transitory storage media carried by the portable electrical energy storage device to one or more back-end systems, by the at least one two-way distribution controller; confirming the validity of the second portion of the data read from the one or more non-transitory storage media carried by the portable electrical energy storage device by the at least one back-end system; and responsive to successfully validating the second portion of the data read from the one or more non-transitory storage media carried by the portable electrical energy storage device by the back-end system, communicating a message indicative of a successful validation to the at least one two-way distribution controller. Confirming the validity of the second portion of the data read from the one or more non-transitory storage media carried by the portable electrical energy storage device by the at least one back-end system may include confirming at least a subscription plan logically associated with subscriber identification data included in the second portion of the data read from the one or more non-transitory storage media carried by the portable electrical energy storage device. Accepting the insertion of a first portable electrical energy storage device into a first of a number of charging modules may include accepting the at least partial insertion of the first portable electrical energy storage device into the first of the number of charging modules; and allowing the removal of the second portable electrical energy storage device from a second of the number of charging modules may include locking the first portable electric energy storage device to the first of the number of charging modules by autonomously displacing a locking hub to a first (locked) position in which a portable electric energy storage device inserted into the first of the number of charging modules cannot be removed; and unlocking the second portable electric energy storage device from the second of the number of charging modules by autonomously displacing a locking hub to a second (unlocked) position in which a portable electric energy storage device can be removed from the second of the number of charging modules. Accepting the at least partial insertion of the first portable electrical energy storage device into the first of the number of charging modules may include autonomously displacing an actuator from a first position to a second position sufficient to cause the displacement of the operably coupled locking hub in the first of the number of charging modules from the first (locked) position to the second (unlocked) position, and autonomously maintaining the actuator in the second position to maintain the locking hub in the second (unlocked) position; and preventing the removal of the first portable electrical energy storage device from the first of the number of charging modules by engaging a locking hub in the first of the number of charging modules autonomously displacing the actuator from the second position to the first position sufficient to cause the displacement of the operably coupled locking hub in the first of the number of charging modules from the second (locked) position to the first (unlocked) position, and autonomously maintaining the actuator in the first position thereby preventing the removal of the first portable electrical energy storage device from the first of the number of charging modules. Autonomously displacing the actuator from the second position to the first position may include de-energizing the actuator and permitting at least one biasing device to return the locking hub in the first of the number of charging modules from the second (unlocked) position to the first (locked) position.

The method may further include receiving, by the at least one two-way distribution controller, at least one output signal provided by at least one biometric sensor; and selecting by the at least one two-way distribution controller, the second portable electrical energy storage device based at least in part on data included in the at least one output signal provided by the at least one biometric sensor.

The method may further include responsive to unsuccessfully authenticating the first portion of the data or responsive to unsuccessfully validating the second portion of the data: displacing an actuator operably coupled to the locking hub in the first of the number of charging modules from a first position to a second position to sufficient displace the locking hub in the first of the number of charging modules from the first (locked) position to a second (unlocked) position thereby permitting the removal of the first portable electrical energy storage device from the first of the number of charging modules; and maintaining an actuator operably coupled to the locking hub in the second of the number of charging modules in a first position sufficient to maintain the locking hub in the second of the number of charging modules in the first (locked) position thereby preventing the removal of the second portable electrical energy storage device from the second of the number of charging modules.

A portable electrical energy storage device charging and two-way distribution system may be summarized as including a housing that includes a power distribution grid and a number of buckets, each of the buckets capable of accommodating the reversible, selective insertion of a portable energy storage device charging module and a power converter module electrically conductively coupled to the power distribution grid and to the portable energy storage device charging module; a first communications interface wirelessly communicably coupleable to at least some of a number of portable energy storage devices inserted into each of the number of buckets and wirelessly communicably coupleable to one or more wireless credentials carried by a system user; a second communications interface communicably coupleable to at least one back-end system; at least one non-transitory, processor-readable, storage media that stores processor-executable instructions; and at least one two-way distribution system controller communicably coupled to the at least one non-transitory, processor-readable storage media, the at least one two-way distribution system controller to execute the processor-executable instructions and in response: receive, via the first communications interface, data indicative of a subscriber identifier that uniquely identifies a subscriber; transmit, via the second communications interface, the received data indicative of the subscriber identifier to the back-end system; responsive to the insertion of a number of portable energy storage devices into a respective number of unoccupied portable energy storage device charging modules, locks the inserted portable energy storage devices into the respective portable energy storage device charging modules; and responsive to the receipt of data indicative of an authorization from the back-end system unlocks an authorized number of charged portable energy storage devices from a respective number of occupied portable energy storage device charging modules. The first communications interface bidirectionally may transfer data with a communications interface carried by a portable energy storage device powered vehicle proximate the portable electric storage device charging system. The first communications interface bidirectionally may transfer vehicle specific data with a communications interface carried by a portable energy storage device powered vehicle proximate the portable electric storage device charging system. The vehicle specific data may include at least one of: vehicle specific maintenance data or vehicle specific service data. The first communications interface bidirectionally may transfer data with a communications interface carried by a portable energy storage device.

The portable electrical energy storage device charging and two-way distribution system may further include at least one biometric sensor communicably coupled to the at least one two-way distribution system controller.

The at least one two-way distribution system controller may execute the processor-executable instructions and further may receive data indicative of at least one subscriber biometric property from the at least one biometric sensor;

and responsive to the receipt of the data indicative of at least one subscriber biometric property, may selectively unlock an authorized number of charged portable energy storage devices from a respective number of occupied portable energy storage device charging modules.

Each portable energy storage device charging module may include a housing dimensioned to accommodate the at least partial insertion of a portable energy storage device casing along a longitudinal axis of the housing into an interior space formed by a peripheral housing wall joined to a base; a number of electric contacts projecting from the base at least partially into the interior space of the housing; a locking mechanism projecting from the base at least partially into the interior space of the housing; an entrance joined to the peripheral housing wall opposite the base, the entrance including an orifice connecting the interior space of the housing to an exterior space about the housing, the perimeter of the orifice closely corresponding to at least one physical aspect of the portable energy storage device casing; a housing door operably coupled to and positioned in the interior of the housing, the housing door continuously axially displaceable along at least a portion of the longitudinal axis of the housing from a first position perpendicular to the housing wall and proximate the orifice to at least second position perpendicular to the housing wall and proximate the base of the housing; an aperture concentric with the longitudinal axis of the housing through the housing door, the aperture to accommodate the passage of at least a portion of the locking mechanism and at least a portion of the number of electric contacts when the housing door is displaced to the second position; at least one biasing element operably coupling the door to the base, the at least one biasing element biasing the housing door towards the first position; and a displaceable cover disposed proximate the aperture and displaceable from a closed position in which the aperture is occluded, to an open position in which the aperture is unobstructed, the cover operably coupled to the housing door and to the housing such that as the housing door is displaced from the first position to the second position, the cover is displaced from the closed position to the open position. Each of the buckets may accommodate the reversibly slideable physical insertion and removal of a charging module. Each of the buckets may accommodate the reversibly slideable physical insertion and removal of a power converter module and the reversibly slideable electrical conductive coupling of the power converter module to a power distribution grid and to the respective charging module inserted in the bucket.

The portable electrical energy storage device charging and two-way distribution system may further include at least one portable electric energy storage device temperature sensor disposed in each of the charging modules; wherein the processor-executable instructions further cause the at least one processor to maintain a temperature of the portable electric energy storage device received by the charging module within a defined temperature range while charging the respective portable electric energy storage device.

A method of operating a portable electric energy storage device two-way distribution, charging, and vending apparatus may be summarized as including receiving a first portable electric energy storage device in a first of a number of charging modules communicably coupled to at least one two-way distribution system controller; responsive to receiving the first portable electric energy storage device in the first of the number of charging modules, determining a condition of the first portable electric energy storage device by the at least one two-way distribution system controller; responsive to determining the condition of the first portable electric energy storage device is acceptable for charging, initiating charging of the first portable electric energy storage device; and contemporaneous with charging the first portable electric energy storage device, maintaining thermal conditions within the first portable electric energy storage device in a defined temperature range.

The method may further include positioning an actuator operably coupled to a locking hub in the first charging module in a first position sufficient to position the locking hub in the first charging module in a first (locked) position thereby preventing the removal of the first portable electric energy storage device from the first of the number of charging modules.

The method may further include responsive to receiving the first portable electric energy storage device in the first of the number of charging modules, reading by the at least one two-way distribution system controller data from a nontransitory storage media carried by the first portable electric energy storage device. Reading by the at least one two-way distribution system controller data from a nontransitory storage media carried by the first portable electric energy storage device may include reading by the at least one two-way distribution system controller, data from a first, immutable, portion of the nontransitory storage media carried by the first portable electric energy storage device, the data in the first, immutable, portion of the nontransitory storage media including data indicative of a manufacturer specific code.

Reading by the at least one two-way distribution system controller data from a nontransitory storage media carried by the first portable electric energy storage device may include reading by the at least one two-way distribution system controller, data from a second, rewriteable, portion of the nontransitory storage media carried by the first portable electric energy storage device, the data in the second, rewriteable, portion of the nontransitory storage media including data indicative of at least one subscriber identifier.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
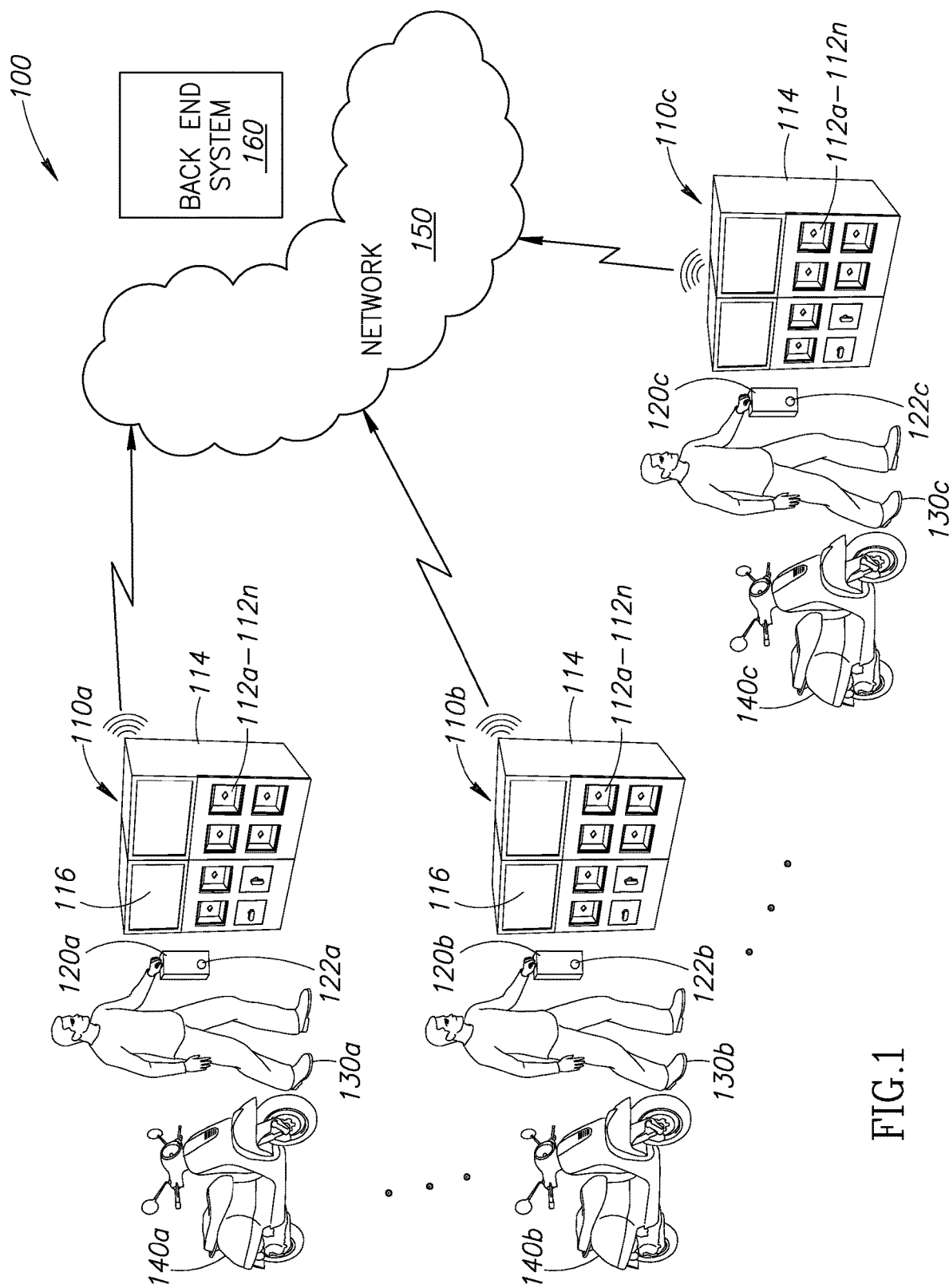
FIG. 1 is a schematic diagram showing an environment in which a number of vehicles powered by portable electric energy storage devices exchange discharged devices for charged devices at a number of two-way distribution and vending systems, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with controllers and/or microprocessors and associated programming, logic, and/or instruction sets; AC/DC power converters; buck and boost transformers; thermal control systems; portable electric energy storage devices (e.g., secondary batteries); networks and network communication protocols; wireless communications protocols; have not been shown or described in detail to avoid unnecessarily obscuring descriptions of the embodiments.

As used herein, "operational aspects" or a reference to one or more "operational aspects" of a vehicle includes the performance or function of any combination or number of systems or devices forming all or a portion of the indicated system. For example, the operational aspects of a vehicular system may include, but are not limited to one or more of: the vehicle cooling system; vehicle fuel system, vehicle steering or directional control system, vehicle suspension, vehicle electrical and ignition system, vehicle drivetrain and power transmission system, vehicle powertrain or motor, vehicle exhaust or emissions, or vehicle braking. An event impacting one or more operational aspects of a vehicle may impact the performance or functionality of one or more of the listed systems. In a similar manner, operational aspects of a vehicle electrical system may include, but are not limited to the performance or function of one or more components normally included in a vehicle electrical system, such as battery discharge rate, ignition, timing, electrical lamps, electrical systems, electrical instrumentation and the like. Thus, an event impacting one or more aspects of a vehicle electrical system may impact the performance or function of one or more electrical system components (e.g., limiting the discharge rate of a battery to limit vehicle speed, preventing the ignition system from starting the vehicle, etc.).

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

FIG. 1 shows a schematic diagram of an illustrative portable electric energy storage device distribution system 100 in which a number of two-way distribution, charging, and vending systems 110a-110n (collectively "two-way distribution, charging, and vending systems 110"). Each of the two-way distribution, charging, and vending systems 110 are capable of receiving, charging, and dispensing portable electric energy storage devices 120a-120n (collectively "portable electric energy storage device 120") from subscribers 130a-130n (collectively "subscribers 130"), according to one illustrated embodiment. Each of the two-way distribution, charging, and vending systems 110 include any number of charging modules 112a-112n (collectively "charging modules 112"). Additionally, each of the two-way distribution, charging, and vending systems 110 includes at least one two-way distribution system controller 114. The two-way distribution, charging, and vending systems 110 may optionally include one or more user interfaces 116 that are communicably coupled to the at least one two-way distribution system controller 114. In some implementations, one or more networks 150 communicably couple some or all of the two-way distribution system controllers 114 to one or more back-end systems 160. The one or more networks 150 may include, but are not limited to, one or more local area networks (LANs); one or more wide area networks (WANs); one or more worldwide network (e.g., the Internet) or combinations thereof.

Vehicles 140a-140n (collectively "vehicles 140") may use one or more portable electric energy storage devices 120 to provide motive power, for example through the use of an electric traction motor. Each of the vehicles 140 is associated with at least one particular subscriber 130 that may include a single individual, multiple individuals, a business or corporation, or a government entity. Based on a subscription plan selected by the subscriber 130, each subscriber 130 is allocated a particular number of portable electric energy storage devices 120 and/or a particular type of portable electric energy storage devices 120 (e.g., standard output, high output, low capacity/short range, high capacity/long range, and the like). A subscriber 130 exchanges a portable electric energy storage device 120 at a two-way distribution, charging, and vending system 110 by inserting an at least partially discharged portable electric energy storage device 120 into a first charging module 112a and removing an at least partially charged portable electric energy storage device 120 from a second charging module 112b. The two-way distribution, charging, and vending system 110 allocates the at least partially charged portable electric energy storage devices 120 to a subscriber 130 based at least in part on the subscription plan selected by the respective subscriber 130.

Each portable electric energy storage device 120 carries a nontransitory storage media 122. At times, manufacturer specific data associated with the portable electric energy storage device 120 may be retained within a first portion of the nontransitory storage media 122 carried by each of the portable electric energy storage devices 120. In some instances, the first portion of the nontransitory storage media 122 may be immutable or otherwise non-rewriteable. In some instances, the manufacturer specific data may be encoded, encrypted, or otherwise rendered unreadable or unintelligible. At times, subscriber identification data associated with the portable electric energy storage device 120 may be retained within a second portion of the nontransitory storage media 122 carried by each of the portable electric energy storage devices 120. In some instances, the second portion of the nontransitory storage media 122 may be rewriteable, for example by the two-way distribution, charging, and vending two-way distribution system 110.

The two-way distribution, charging, and vending system 110 advantageously provides a subscriber 130 with the ability to obtain charged portable electric energy storage devices 120 on an as-needed or on-demand basis, contingent upon the subscription plan selected by and logically associated with the respective subscriber 130. The charging modules 112a-112n are each capable of accepting the insertion of a single portable electric energy storage device 120. Once inserted into the charging module 112, the portable electric energy storage device 120 is locked into or otherwise securely retained in the charging module 112 and charged under defined, controlled, conditions established and maintained by the two-way distribution system controller 114. The two-way distribution system controller 114 may cause a display on the at least one user interface 116 of subscription information, subscription upgrade offers, other offers, diagnostic information regarding their exchanged portable electric energy storage device 120, diagnostic information regarding the subscriber's vehicle 140, or combinations thereof.

The two-way distribution system controller 114 may be communicably coupled via network 150 to one or more back-end systems 160. The communicable coupling between the two-way distribution system controller 114 and the back-end system 160 may include a wired communicable coupling (e.g., via Ethernet, plain old telephone service, and the like) or wireless communicable coupling (e.g., via cellular connection such as GSM, CDMA, or via a wireless network connection such as IEEE 802.11, Internet, and the like) or combinations thereof. In some instances, the two-way distribution system controller 114 may have multiple communicable couplings (e.g., one connection via terrestrial wired POTS and a second via wireless cellular or satellite) with the back-end system 160 to provide redundant and/or failover communications capabilities.

In some implementations, the two-way distribution, charging, and vending system 110 may optionally include any number of input/output (I/O) devices. Such I/O devices communicate data read or otherwise obtained by the I/O device to the two-way distribution system controller 114. For example, a cash or currency (i.e., bill, coin, and/or token) acceptor may be communicably coupled to the two-way distribution system controller 114 to permit the acceptance of cash payments (i.e., point-of-sale or subscription payments) at the two-way distribution, charging, and vending two-way distribution system 110. In another example, a magnetic stripe reader may be communicably coupled to the two-way distribution system controller 114 to permit the acceptance of credit and/or debit card payments and also to permit the use of subscriber identification cards with the two-way distribution, charging, and vending two-way distribution system 110. In another example, a near field communication (NFC) or other similar short-range wireless communications interface may be communicably coupled to the two-way distribution system controller 114. Such short-range wireless communication interfaces permit the two-way distribution system controller to 114 obtain data from subscriber identification tokens (e.g., keyfobs, cards, medallions, or the like) and/or vehicle information (e.g., maintenance, service, and similar diagnostic information) from the subscriber's vehicle 140.

The two-way distribution system controller 114 may provide operational or maintenance information to the back-end system 160 thereby permitting autonomous repair/replacement scheduling capabilities. For example, the two-way distribution system controller 114 may communicate data indicative of a faulty charging module, power converter, or portable electric energy storage device 120 to the back-end system 160. In some implementations, the back-end system 160 may perform limited troubleshooting of identified malfunctioning two-way distribution, charging, and vending system 110 components. For example, the back-end system 160 may reboot or otherwise restart the two-way distribution system controller 114 and/or one or more identified malfunctioning components. In another instance, the two-way distribution system controller 114 may communicate data representative of operating, maintenance, and/or fault conditions (e.g., in the form of fault codes, QR codes, temperatures, operational currents, operational voltages, and the like) to the back-end system 160 thereby permitting the timely dispatch of repair personnel to the two-way distribution system 110. In some implementations, the back-end system 160 may selectively disable malfunctioning two-way distribution system components in order to preserve other functional components in a stable operating state. For example, the two-way distribution system controller 114 and/or back-end system 160 may disconnect a charging module 112a suffering a high current fault condition from the power distribution network within the two-way distribution, charging, and vending system 110 to permit the operation of other function charging modules 112b-112n.

In some instances, the back-end system 160 may retain data indicative of the subscription plan associated with each respective one of the subscribers 130a-130n. In such instances, the two-way distribution system controller 114 reads the subscriber identification data associated with the portable electric energy storage device 120 from the second portion of the nontransitory storage media 122 carried by each of the portable electric energy storage devices 120 and communicates at least some of the read data to the back-end system 160. The back-end system 160 validates or otherwise confirms the subscriber identification data provided by the two-way distribution system controller 114. The back-end system 160, communicates data indicative of a successful or unsuccessful validation of the subscriber identification information to the two-way distribution system controller 114. Responsive to receipt of data indicative of a successful validation, the two-way distribution system controller 114 may cause the two-way distribution, charging, and vending system 110 to discharge or otherwise dispense one or more portable electric energy storage devices 120 to the respective subscriber 130.

At times, the back end system 160 may periodically publish or "push" data indicative of subscribers having accounts in good standing (e.g., current, prepaid, showing zero balance due) and/or data indicative of subscribers having accounts not in good standing (e.g., delinquent, unpaid, or showing a past-due balance) to the two-way distribution, charging, and vending system 110. Such subscriber account data may be locally retained in each two-way distribution, charging, and vending system 110 in a respective non-transitory storage. At times, the back-end system 160 may maintain databases or data stores containing data indicative of subscriber account information in nontransitory storage that is remote from the two-way distribution, charging, and vending system 110. Such subscriber account information may be intermittently, periodically, or continuously communicated by the back-end system 160 to some or all of the two-way distribution, charging, and vending systems 110.

The portable electric energy storage devices 120 can include any current or future developed system, device, or combinations of systems and devices capable of storing or creating energy in the form of an electrical charge. Example portable electric energy storage devices 120 can include, but are not limited to, secondary (i.e., rechargeable) batteries having any current or future developed battery chemistry, ultracapacitors, supercapacitors, and the like. Illustrative portable electric energy storage devices 120 include, but are not limited to, lead/acid batteries, nickel/cadmium batteries, lithium ion batteries, and similar rechargeable battery types. Each portable electric energy storage device 120 is contained within a resilient casing, enclosure, or housing that includes a number of externally accessible electrical contacts for discharging and charging the respective portable electric energy storage device 120. In some instances, one or more phase change materials may be integrated into the portable electric energy storage device 120 to provide thermal management capabilities.

Each portable electric energy storage device 120 may have a casing, enclosure, or housing with one or more ergonomic features to facilitate portage of the portable electric energy storage device 120, and the insertion and removal of the portable electric energy storage device 120 from the two-way distribution, charging, and vending system 110. For example, each portable electric energy storage device 120 may include a protrusion, knob, or handle to facilitate the insertion and removal of the portable electric energy storage device 120 from the vehicle 140 and/or the charging module 112 in the two-way distribution, charging, and vending two-way distribution system 110. Each of the portable electric energy storage devices 120 may have the same or different electrical charge capacity. Each of the portable electric energy storage devices 120 may have the same or different electric energy discharge characteristics. One characteristic shared by each of the portable electric energy storage devices 120 is the retention of data indicative of the manufacturer specific identifier in the first portion of the nontransitory storage media 122 carried by each of the portable electric energy storage devices 120.

In some implementations, upon receipt of a portable electric energy storage device 120 in one of a number of charging modules 112, the two-way distribution system controller 114 authenticates the manufacturer identifier retained in the nontransitory storage media 122 carried by a portable electric energy storage device 120 prior to charging the portable electric energy storage device 120. In some instances, the two-way distribution system controller 114 may provide a message via the user interface 116 upon a failure to authenticate the manufacturer identifier retained in the nontransitory storage media 122 of a portable electric energy storage device 120 received by a charging module 112.

Figure 2A:
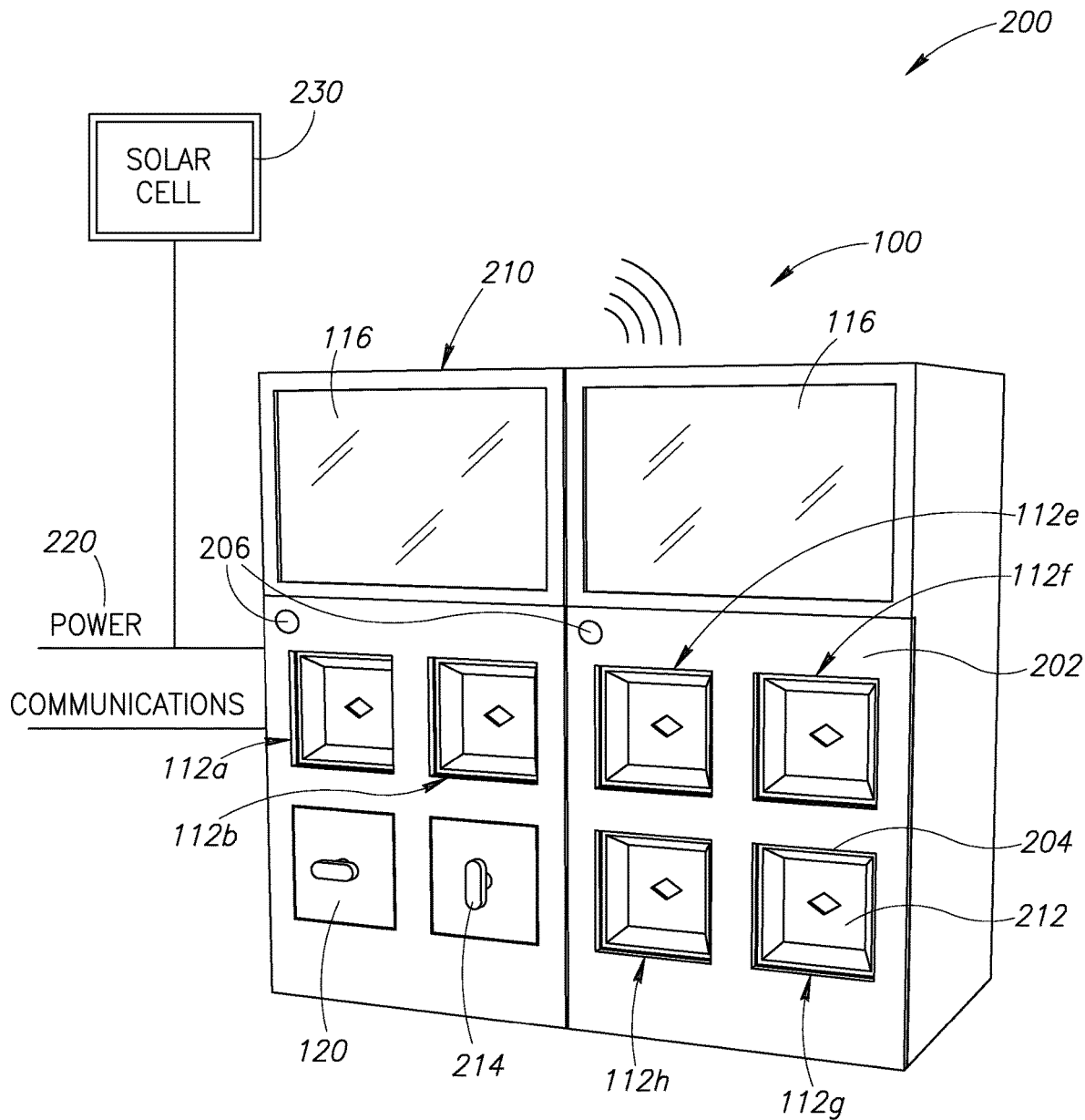
FIG. 2A is a perspective view showing an exterior of an example two-way distribution, charging and vending system having four (4) charging modules, according to one non-limiting illustrated embodiment.

FIG. 2A shows an exterior perspective view of an example two-way distribution, charging, and vending system 110 as depicted in FIG. 1, according to one illustrated embodiment. The two-way distribution, charging, and vending system 110 depicted in FIG. 2A is coupled to an expansion module 210 that provides a number of additional charging modules 112 (four (4) shown in FIG. 2A, 112e-112h, greater or lesser number possible) to the base two-way distribution, charging, and vending two-way distribution system 110. It should be understood that each two-way distribution, charging, and vending system 110 may include any number charging modules 112 and that each two-way distribution, charging, and vending system 110 may have the same or different numbers of charging modules 112.

Also visible in FIG. 2A is the exterior housing 202 and the gaskets 204 that surround each of the charging modules 112 to provide a weatherproof seal between the housing 202 and the charging module 112. The occupied charging modules 214 each contain a single portable electric energy storage device 120.

At least a portion of the power consumed by the two-way distribution, charging, and vending system 110 for control, operation, and/or charging of portable electric energy storage devices 120 may be provided via one or more connections 220 to a power supply such as a local power distribution grid. In some implementations, at least a portion of the power consumed by the two-way distribution, charging, and vending system 110 for control, operation, and/or charging of portable electric energy storage devices 120 may be alternatively or additionally provided via one or more renewable energy sources. For example, one or more solar cell arrays 230 may be electrically conductively coupled to the two-way distribution, charging, and vending two-way distribution system 110.

In some instances, the two-way distribution, charging, and vending system 110 may include one or more biometric sensors 206. Such biometric sensors 206 may include, but are not limited to, one or more: visible or infrared still or video cameras, proximity detectors, ultrasonic transducers, or any other sensors, systems, or combination of sensors and systems capable of detecting one or more biometric aspects of the subscriber 130 attendant at the two-way distribution, charging, and vending system 110. Such biometric sensors 206 may provide various input signals to the at least one two-way distribution system controller 114. Responsive to the receipt of the signals provided by the biometric sensor 206, the at least one two-way distribution system controller 114 may select a particular charged portable electric energy storage device 120 for release to the subscriber 130 based at least in part on data provided by the biometric sensor signal. Thus, for example, the at least one two-way distribution system controller 114 may release a portable electric energy storage device 120 from the lower portion of the two-way distribution, charging, and vending system 110 if the detected height of the subscriber 130 falls below a defined height threshold value (e.g., less than 152 cm or about 5 feet).

Figure 2B:
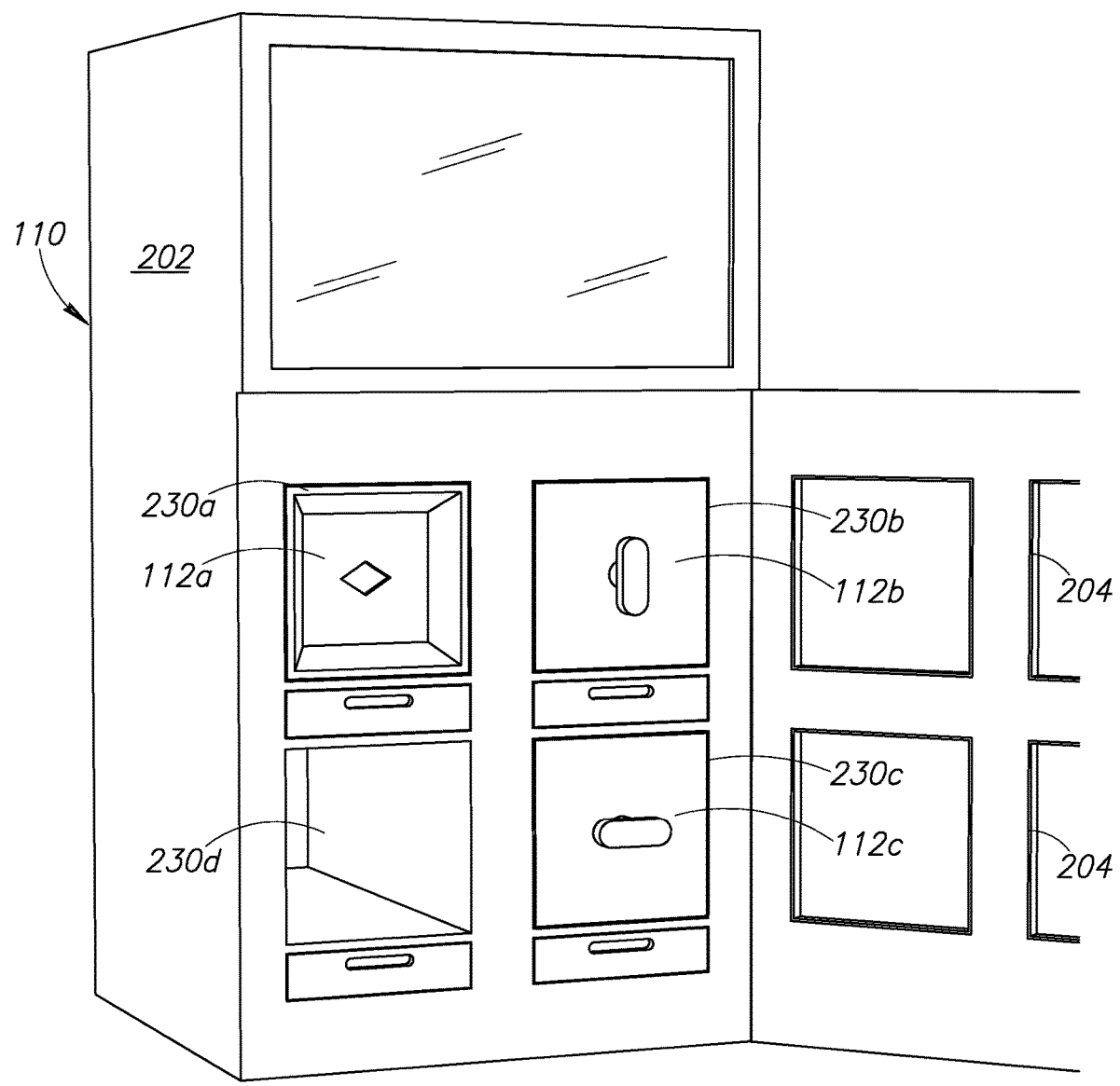
FIG. 2B is a perspective view showing an interior of the example two-way distribution, charging and vending system in FIG. 2A, with the front cover opened exposing three (3) charging module buckets containing charging modules and one (1) empty charging module bucket, according to one non-limiting illustrated embodiment.
Figure 2C:
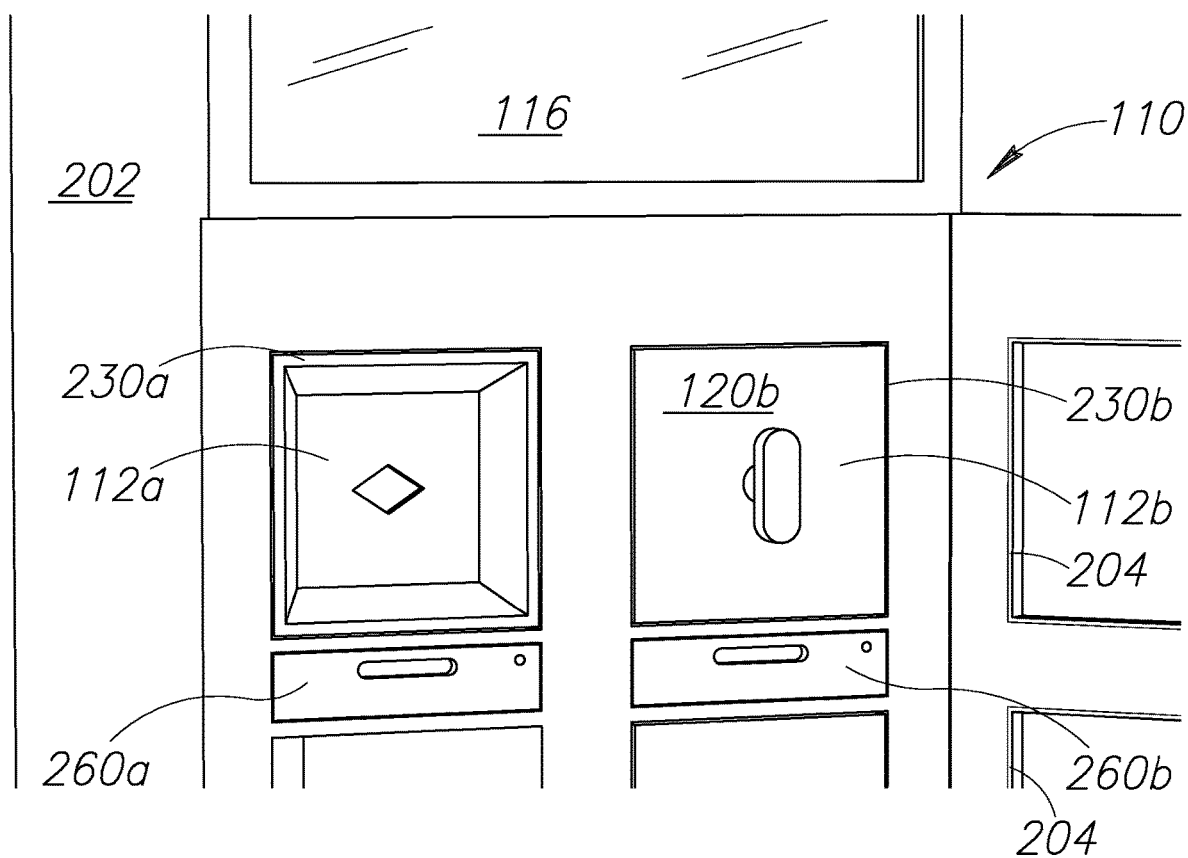
FIG. 2C is a perspective view of the example two-way distribution, charging and vending system in FIG. 2A, with the front cover opened exposing a number of charging modules, in which one of the charging modules contains a portable electric energy storage device, according to one non-limiting illustrated embodiment.

FIGS. 2B and 2C show perspective views of the interior of an example two-way distribution, charging, and vending system 110 as depicted in FIGS. 1 and 2A, with a portion of the exterior housing 202 pivotably displaced to expose the internal structure of the two-way distribution system 110, according to one illustrated embodiment.

FIG. 2B shows a perspective view of the interior of a two-way distribution, charging, and vending system 110 in which charging modules 112a-112c are installed in respective "buckets" or partitions 230a-230c within the two-way distribution system 110 and one "bucket" or partition 230d within the two-way distribution system 110 remains empty. In some implementations, the individual charging modules 112 are of a modular construction that facilitates the slideable insertion and removal of the charging module 112 from a bucket 230. Such modular construction advantageously facilitates the removal and replacement of an entire charging module 112 without requiring the tedious and time consuming rewiring of power, control, and/or communications to the newly inserted charging module 112. Such modular construction may facilitate the tool-less or tool-free insertion and removal of a charging module 112 from a bucket 230. Each of the charging modules 112 includes a mechanical locking device (not visible in FIG. 2B or 2C) adapted to retain a portable electric energy storage device 120 in the charging module. The mechanical locking device also includes a number of electrical contacts or electrodes (also not visible in FIG. 2B or 2C) that correspond and conductively couple to a complimentary number of externally accessible electrical contacts on the portable electric energy storage device 120. These and other features that advantageously facilitate the replacement of the charging modules 112 will be discussed in detail in FIGS. 3A-3E.

FIG. 2C shows a perspective view of the interior of a two-way distribution, charging, and vending system 110 in which a portable electric energy storage device 120b has been received in one charging module 112b disposed in bucket 230b of the two-way distribution system 110. A second charging module 112a disposed in bucket 230a is empty and has not yet received a portable electric energy storage device 120. Also evident in FIG. 2C is the exposed handle on the portable electric energy storage device 120b which permits a subscriber to insert and remove the portable electric energy storage device 120b from a charging module 112b.

Figure 2D:
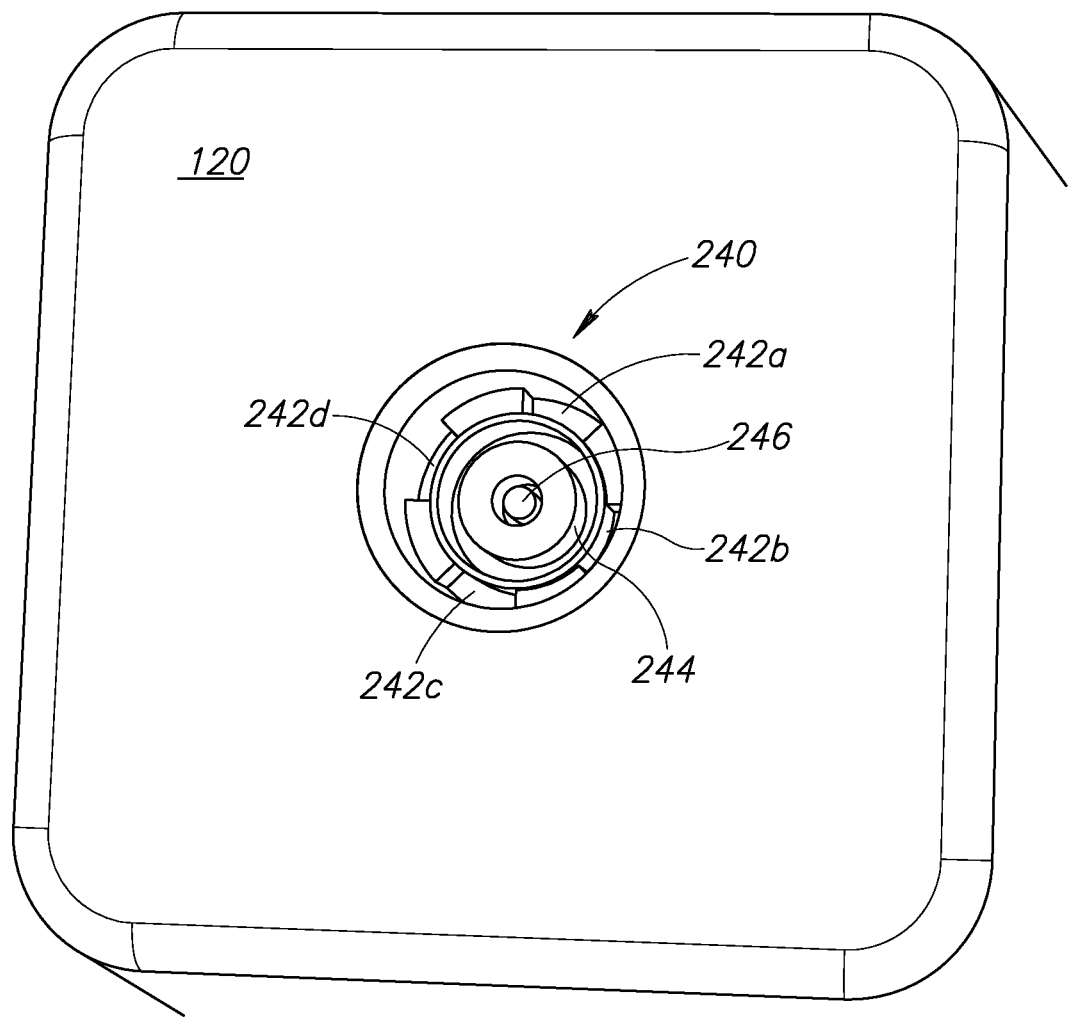
FIG. 2D is a plan view of the bottom surface of an example portable electric energy storage device that includes a number of locking slots and a number of electrical charging contacts, according to one non-limiting illustrated embodiment.

FIG. 2D shows a plan view of the bottom surface of an example portable electric energy storage device 120 showing an exemplary locking connector and electrical coupling assembly 240. The locking connector and electrical coupling assembly 240 include a number of cavities 242a-242d (four shown, greater or lesser numbers possible—collectively "cavities 242") that each receive a corresponding complimentary locking member (see FIG. 2E) when the portable electric energy storage device 120 is received by the charging module 112.

The assembly 240 additionally includes a number of electrical contacts (two shown 244, 246, other numbers possible) located within recesses on the portable electric energy storage device 120. The electrical contacts 244, 246 are electrically isolated from the charging module 112 and from each other. Although positioned radially, the electrical contacts 244, 246 may be positioned in any similar recess on the portable electric energy storage device 120. Example recesses include recesses capable of having any concentric shape or configuration, for example concentric triangular recesses, square recesses, rounded square recesses, polygonal recesses, or rounded polygonal recesses.

Figure 2E:
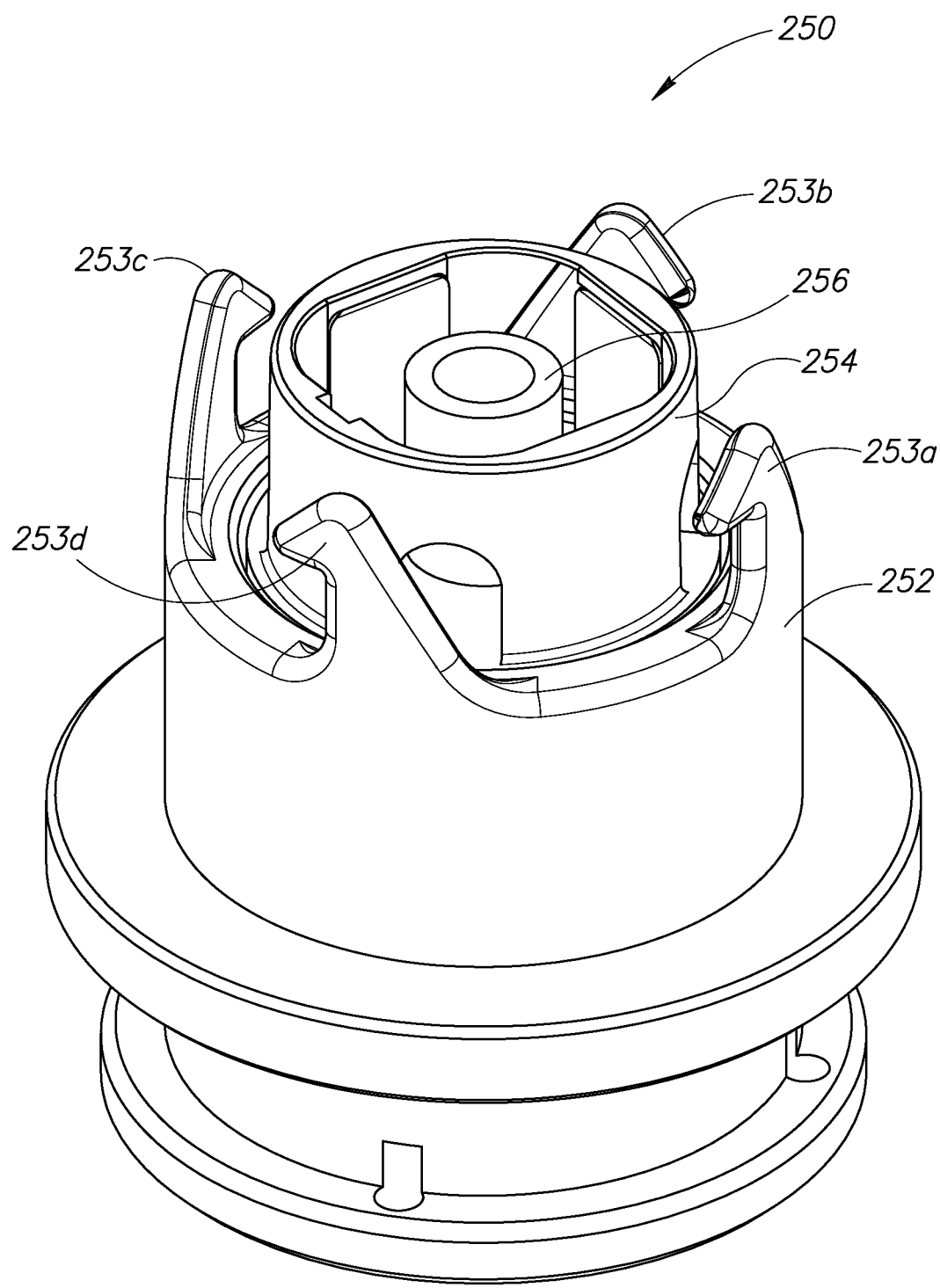
FIG. 2E is a perspective view of an illustrative charging module locking hub that includes a number of locking members adapted to engage a corresponding number of complimentary locking slots on the portable electric energy storage device and a number of electrical charging contacts adapted to conductively couple to a corresponding number of complimentary electrical charging contacts on the portable electric energy storage device depicted in FIG. 2D, according to one non-limiting illustrated embodiment.

FIG. 2E is a perspective view of an exemplary complimentary locking hub and electrical contact assembly 250 disposed in each of the charging modules 112. The locking hub and electrical contact assembly 250 includes a rotatable locking hub 252 with a number of locking members 253a-253d (four shown, greater or lesser numbers possible—collectively "locking members 253") that are each received in a corresponding one of the cavities 242a-242d when the portable electric energy storage device 120 is received by the charging module 112. By rotating the locking hub 252, each of the locking members 253 engages an edge of a respective one of the recesses 242, thereby preventing the removal of the portable electric energy storage device 120 from the charging module 112. The locking hub and electrical contact assembly 250 also include a number of electrical contacts (two shown 254, 256, other numbers possible).

Generally, the electrical contacts 254, 256 are disposed concentrically inward of the locking hub 252 along an axis normal to the center of the locking hub 252. The electrical contacts 254, 256 are electrically isolated from the charging module 112 and from each other. Although the electrical contacts 254, 256 are shown as radially concentric circular objects in FIG. 2E, the electrical contacts 254, 256 can have any concentric shape or configuration, for example concentric triangles, squares, rounded squares, polygons, and/or rounded polygons. When the charging module 112 receives the portable electric energy storage device 120, the electrical contacts 254, 256 fit within the complimentary apertures on the portable electric energy storage device 120 thereby providing an electrically continuous path between the power distribution grid in the two-way distribution, charging, and vending system 110 and the portable electric energy storage device 120. Advantageously, the concentric placement of the locking hub 252 and the electrical contacts 254, 256 permits the insertion of the portable electric energy storage device 120 into the charging module 112 without requiring the subscriber to specifically orient the portable electric energy storage device 120.

Figure 2F:
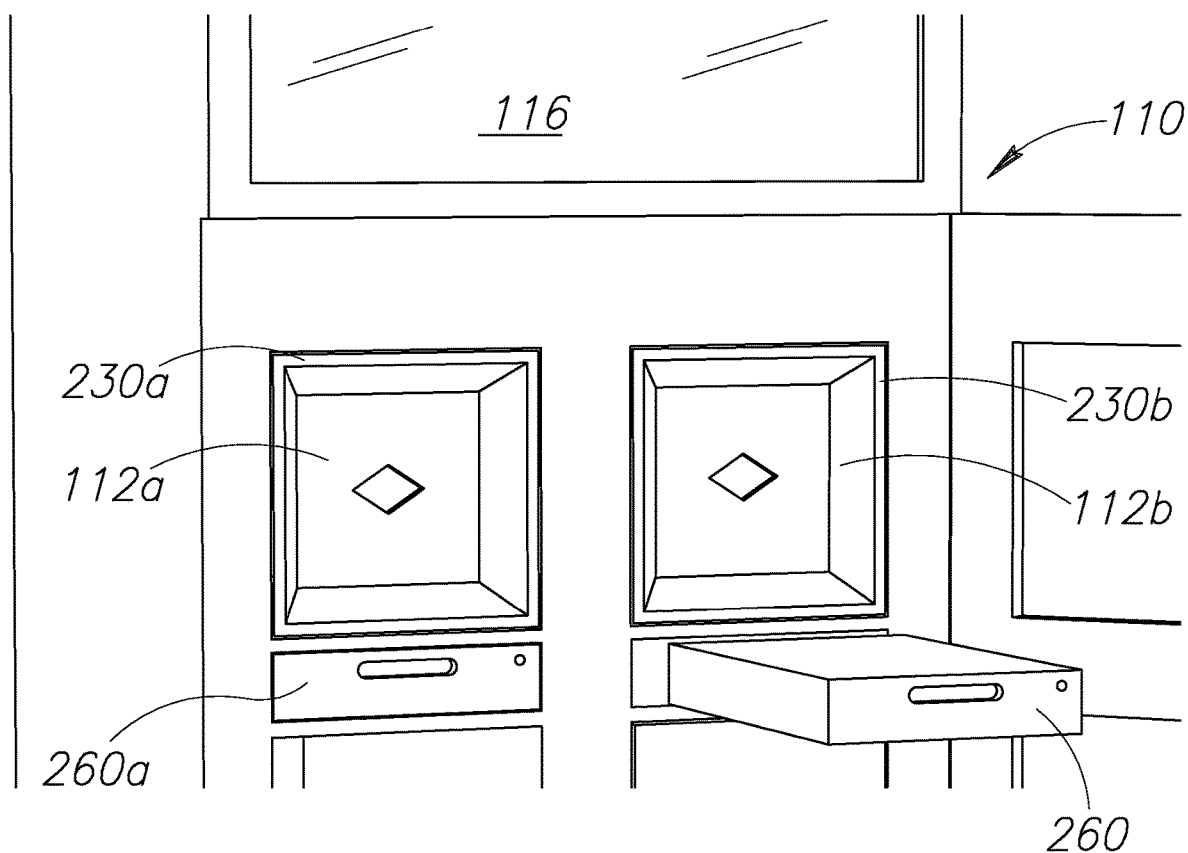
FIG. 2F is a perspective view of an illustrative power converter module insertable into the two-way distribution, charging and vending system in FIG. 2A used to convert power received from a power grid and/or renewable energy source to direct current useful for charging a portable electric energy storage device, according to one illustrated embodiment.

FIG. 2F shows a modular power converter 260 electrically conductively coupleable to at least one charging module 112 used to provide direct current to a portable electric energy storage device 120 received by the charging module 112, according to an illustrated embodiment. The modular power converter 260 includes one or more modular interfaces 262 (not visible in FIG. 2F). The one or more modular interfaces 262 include one or more inputs to receive power from the power (e.g., alternating current or AC power) distribution grid within the two-way distribution system 110. The one or more modular interfaces include one or more outputs to provide power (e.g., direct current or DC power) to an electrically conductively coupled charging module 112. In addition, the modular power converter 260 may include one or more tethered or wireless communications interfaces to bidirectionally communicably couple to the one or more two-way distribution system controllers 114.

The physical construction of the modular power converter 260 and the one or more modular interfaces 262 permit the slideable physical insertion and removal of the modular power converter 260 to and from the two-way distribution system 110. Such construction advantageously permits the rapid field replacement of a failed modular power converter 260 without requiring the field repair of the failed modular power converter 260. In some instances, the modular power converter 260 can include one or more ergonomic handles or other devices to facilitate the insertion and/or removal of the modular power converter 260 from the bucket 230.

In some implementations, the two-way distribution system controller 114 monitors one or more aspects of the performance of each modular power converter 260 installed in the two-way distribution system 110. In some implementations, in addition to monitoring the one or more performance aspects of each modular power converter 260, the two-way distribution system controller 114 also controls one or more output aspects of the current supplied by the modular power converter 260 to the portable electric energy storage device 120. For example, the two-way distribution system controller 114 may control the current flow to the portable electric energy storage device 120 to maintain the temperature of the portable electric energy storage device 120 within a defined range during charging. In another example, the two-way distribution system controller 114 may coordinate the power consumption of multiple modular power converters 260 by adjusting the output current provided by each of the modular power converters 260 based on the charge level of the electrically coupled portable electric energy storage device 120. Thus, the two-way distribution system controller 114 may permit a higher current output from modular power converters 260 electrically coupled to portable electric energy storage devices 120 at a lower charge state and proportionately less current flow to those portable electric energy storage devices 120 as the charge level increases. In some instances, the two-way distribution system controller 114 may notify the back-end system 160 responsive to detecting a malfunction in one or more modular power converters 260.

Figure 3A:
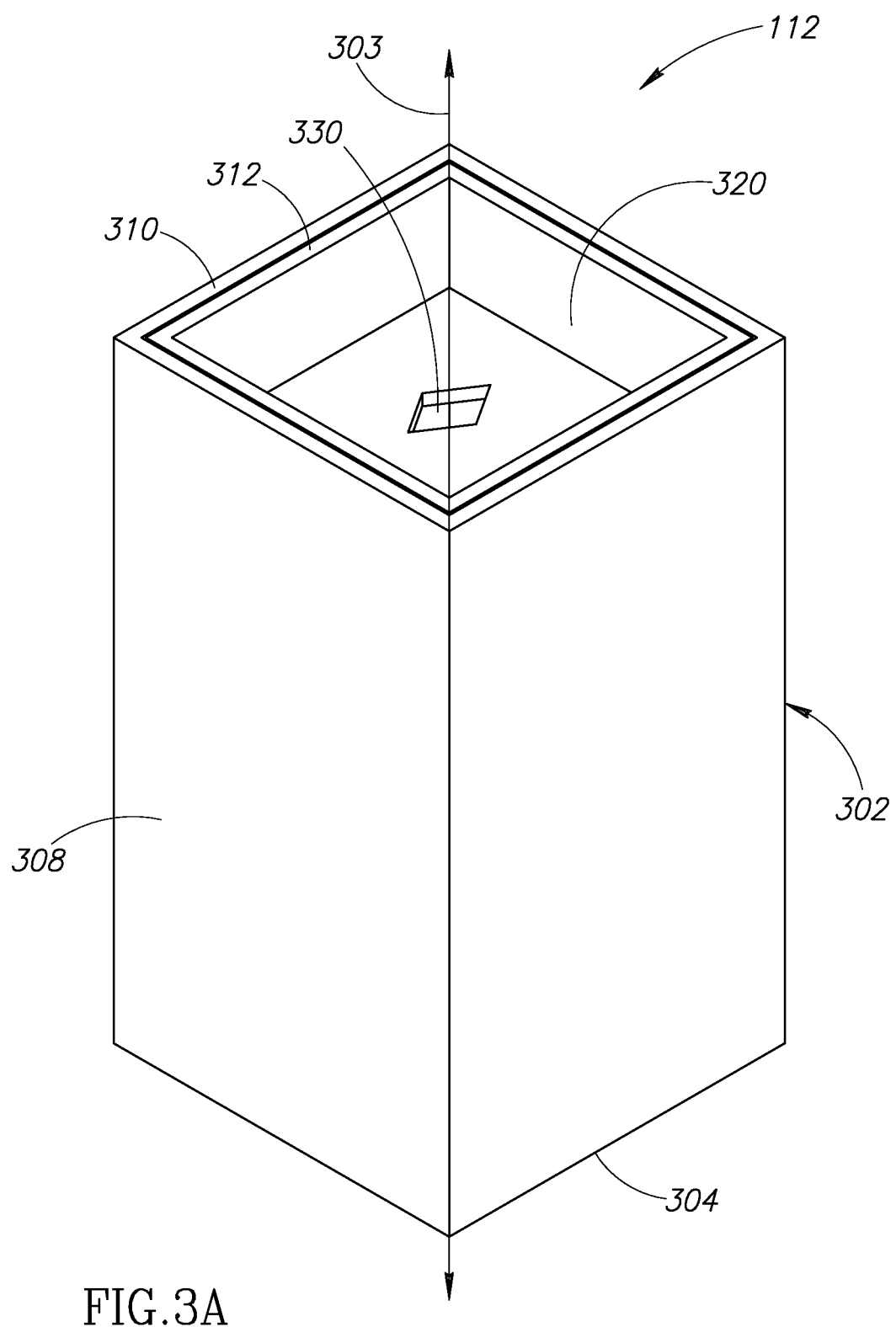
FIG. 3A is a perspective view of an example charging module, according to one non-limiting illustrated embodiment.
Figure 3B:
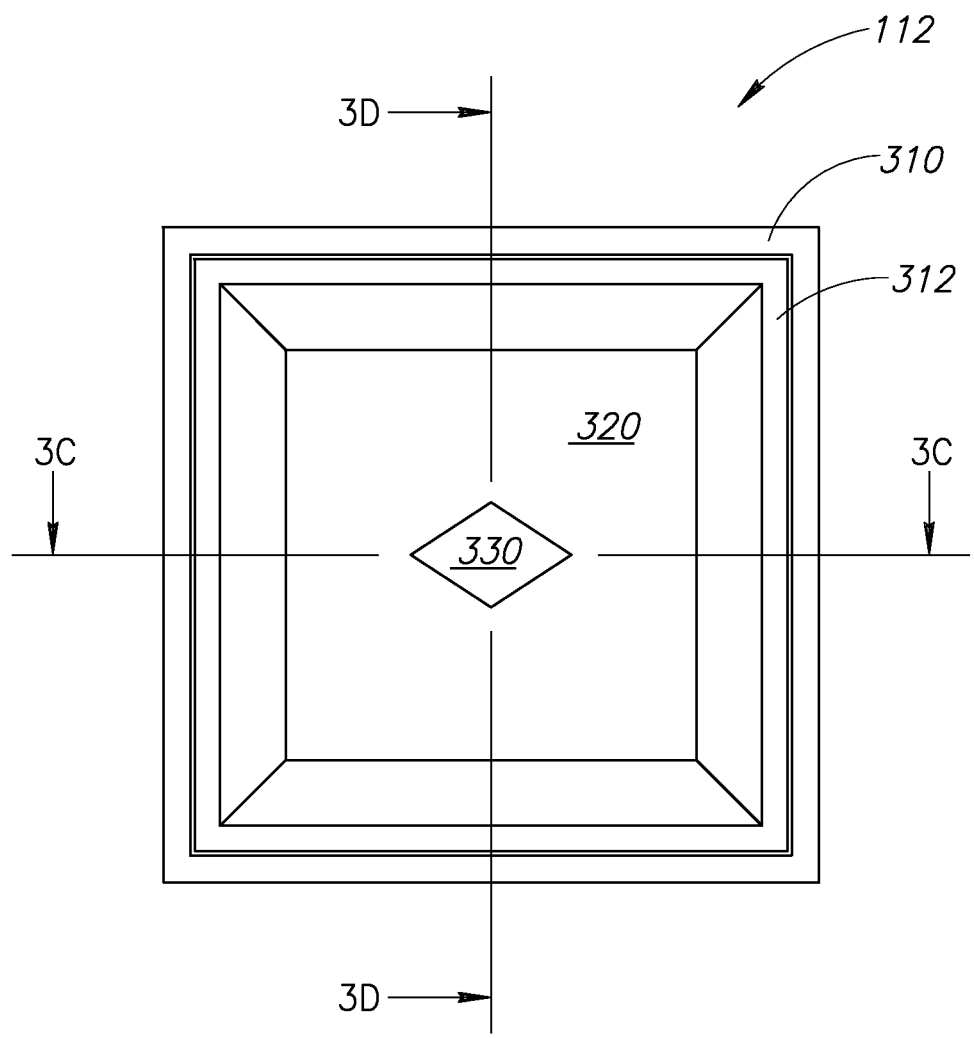
FIG. 3B is a plan view of a top of an example charging module that shows the housing door and aperture centered on the housing door, according to one non-limiting illustrated embodiment.
Figure 3C:
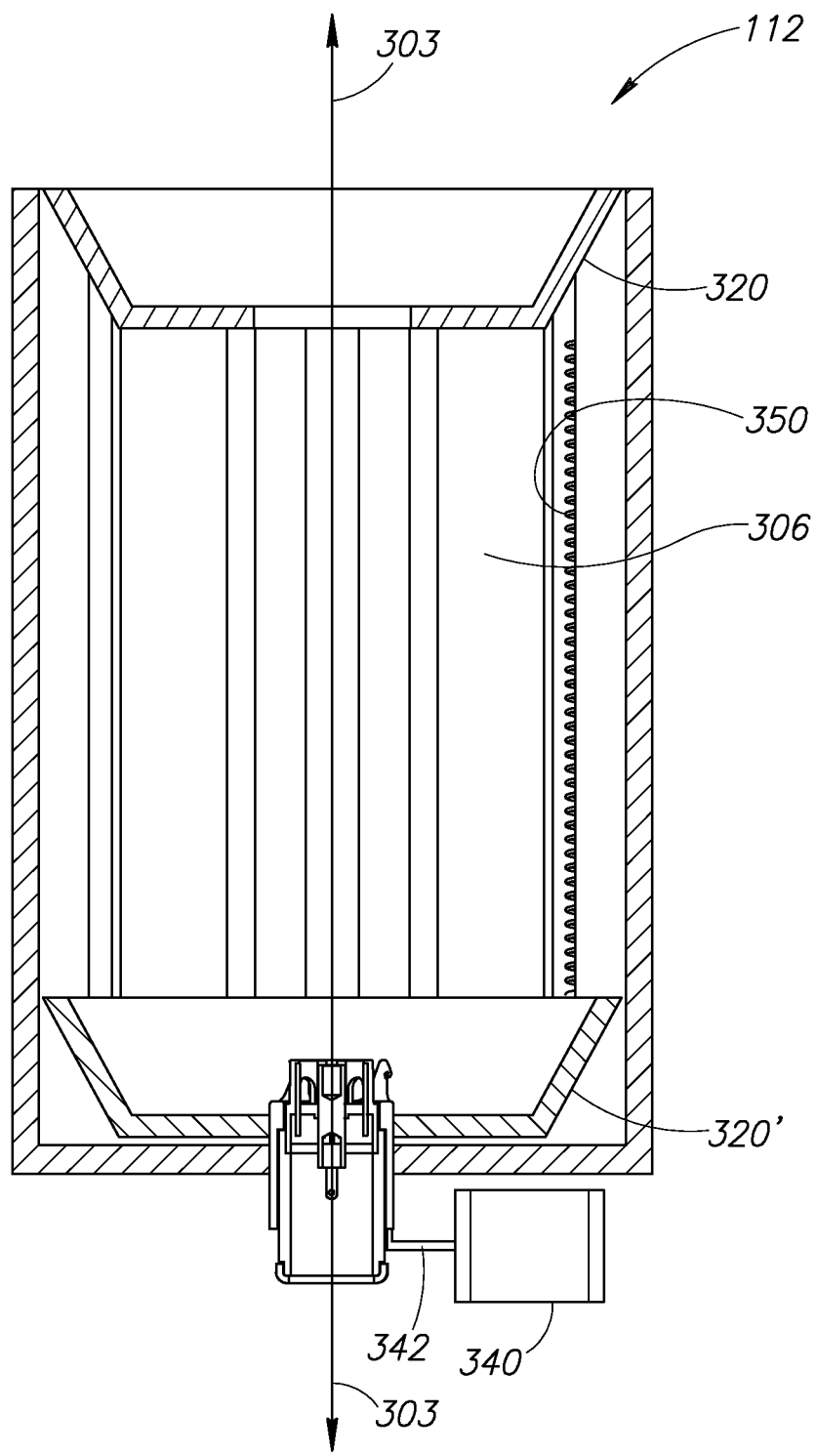
FIG. 3C is a cross-sectional view along section line 3C showing the physical and spatial relationship between the displaceable housing door, the locking hub, and the number of electrical contacts, according to one non-limiting illustrated embodiment.
Figure 3D:
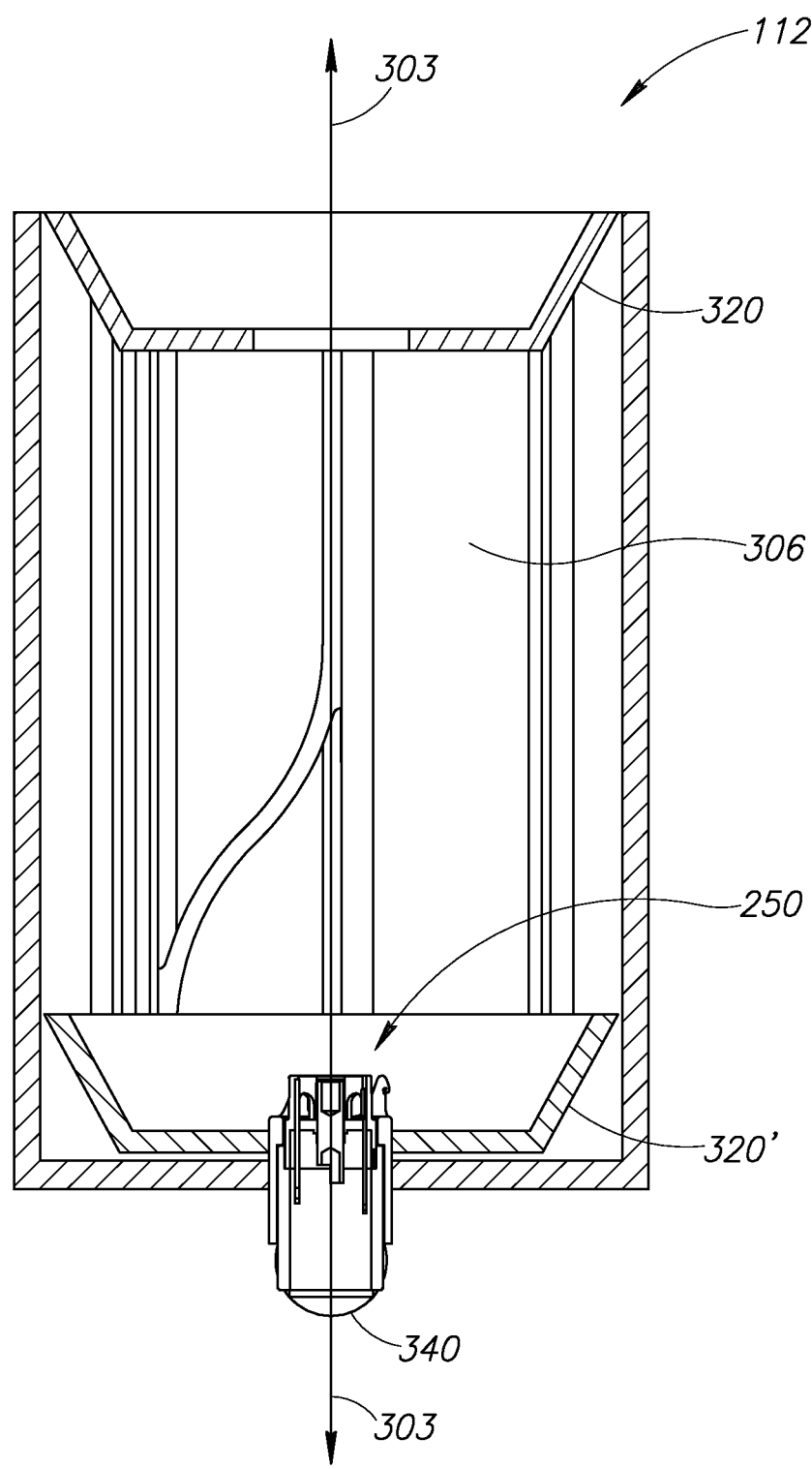
FIG. 3D is a cross-sectional view along section line 3D showing the relationship between the displaceable housing door, the locking hub, the number of electrical contacts, and an example aperture cover, according to one non-limiting illustrated embodiment.
Figure 3E:
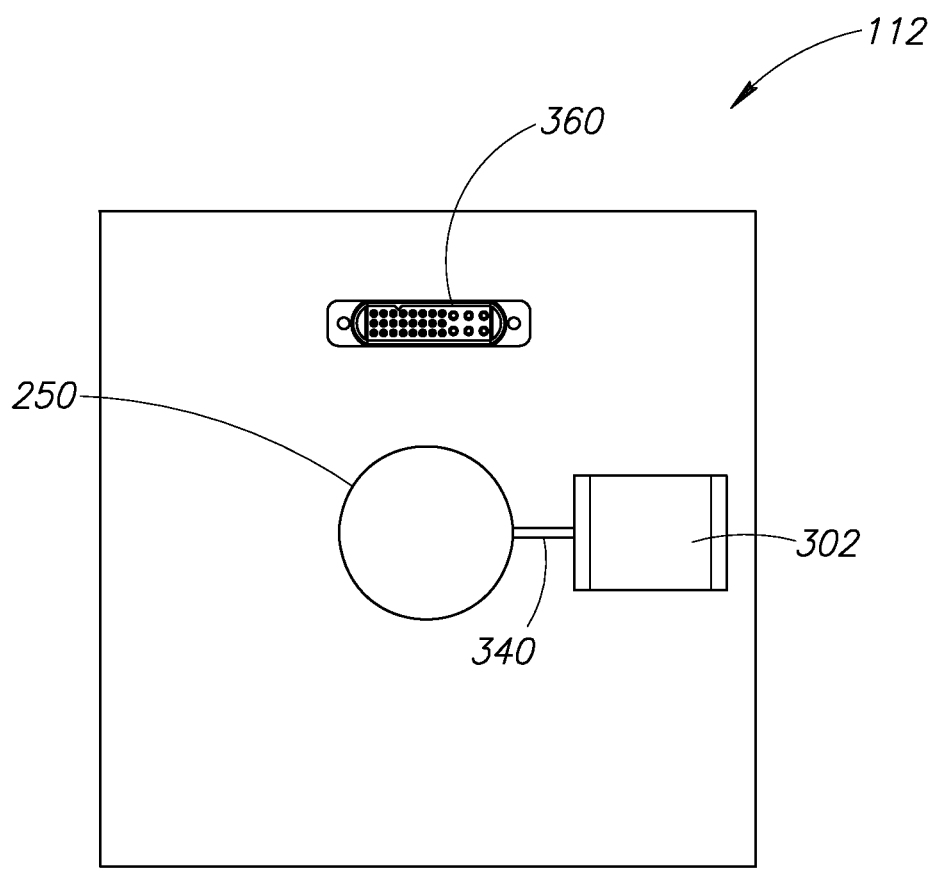
FIG. 3E is a plan view of a bottom of an example charging module that shows various communication and power connectors, the locking hub and the actuator for the locking hub, according to one non-limiting illustrated embodiment.

FIGS. 3A-3E show an example charging module 112, according to an illustrated embodiment. FIG. 3A shows a perspective view of an example charging module 112. FIG. 3B shows a plan view of the top of the example charging module 112 in FIG. 3A. FIG. 3C shows a cross sectional elevation view of the example charging module 112 in FIG. 3A along section line 3C-3C in FIG. 3B. FIG. 3D shows a cross sectional elevation view of the example charging module 112 in FIG. 3A along section line 3D-3D in FIG. 3B. FIG. 3E shows a plan view of the base of the example charging module 112 in FIG. 3A.

The charging module 112 includes a housing 302 that is disposed about a longitudinal axis 303 to form an internal space 306. The charging module 112 further includes a base 304 that is generally normal to the longitudinal axis 303 and is physically attached to a first end of the housing 302. The charging module 112 includes an entrance 310 that is generally normal to the longitudinal axis 303 and physically attached to the housing 302. The entrance 310 includes an orifice 312 through which the interior space 306 defined by the housing 302 is accessed. A housing door 320 that is displaceable along the longitudinal axis 303 covers or otherwise obstructs at least a portion of the orifice 312. An aperture 330 having any shape or configuration (e.g., diamond, square, circular, oval) centered on the longitudinal axis 303 penetrates the housing door 320. One or more surface features 308 (e.g., detents, slots, grooves) may be formed on one or more external surfaces of the housing 302. In various implementations, the one or more recesses, detents, slots or grooves 308 may align the charging module 112 with the bucket 320 in the two-way distribution, charging, and vending system 110 thereby facilitating the slideable insertion of the charging module 112 into the bucket 230.

Referring now to FIG. 3C, the housing door 320 is shown in two positions, a first position 320 proximate the entrance 310 and a second position 320' proximate the base 304. When the charging module 112 is inserted into a bucket 230 and the two-way distribution, charging, and vending system housing 202 is closed, the gasket 204 forms a weatherproof seal around the orifice 312. In the absence of a portable electric energy storage device 120 in the charging module 112, a number of biasing members 350 biases the housing door to the first position proximate the entrance 310. When the housing door 320 is in the first position, a displaceable cover 360 obstructs the aperture 330.

Visible in FIG. 3C is the locking hub and electrical contact assembly 250. The rotatable locking hub 252 extends at least partially into the internal space 306 and is centered along the longitudinal axis 303 of the housing 302. The rotatable locking hub 252 is operably physically coupled to an actuator 340 via one or more linking members 342. In some instances, the actuator 340 may be a maintained position type actuator that remains in the last position until a signal is received by the actuator 340 to move to a new position. In some instances, the actuator 340 may be spring loaded or otherwise biased to one position after the energy source is removed from the actuator 340. In at least one embodiment, the actuator 340 is biased to a position in which the locking member 253 on the rotatable locking hub 252 engage the corresponding cavities 242 on a portable electric energy storage device 120 inserted into the internal space of the charging module 112. In other instances, the actuator can linearly translate the locking hub 252 to engage corresponding cavities 242 on the portable electric energy storage device 120. For example, the actuator 340 may cause a linear displacement of a bar-type locking hub member into a corresponding cavity 242 on the portable electric energy storage device 120.

When inserted into the interior space 306 of the charging module 112, a portable electric energy storage device 120 displaces the housing door 320 along the longitudinal axis 303 of the housing 302 using the force of insertion of the portable electric energy storage device 120. With reference to FIG. 3D, in some instances the displaceable cover 360 may have one or more shaft members 362 that slide along a serpentine slot 352 formed in, along, or through at least one wall of the interior space 306. As the housing door 320 is displaced along the longitudinal axis 303, the shaft 362 travels along the serpentine slot 352, moving the displaceable cover 360 away from and consequently opening the orifice 330. The locking hub and electrical contact assembly 250 is thus permitted to at least partially pass through the orifice 330 when the housing door 320 is in the second position.

The passage of the locking hub and electrical contact assembly 250 through the orifice 330 when the housing door 320 is in the second position permits electrical contact between the electrical contacts 254, 256 that provide power from the modular power converter 260 and the electrical contacts 244, 246 positioned in the recesses 242 on the portable electric energy storage device 120. Such permits the modular power converter 260 to provide energy to charge the portable electric energy storage device 120. When the portable electric energy storage device 120 is removed from the charging module 112, the biasing members 350 cause the displacement of the housing door 320 from the second position to the first position. As the housing door 320 travels from the second position to the first position along the longitudinal axis 303, the shafts 362 coupled to the displaceable cover 360 travel along the serpentine slots 352, moving the displaceable cover 360 towards and consequently obstructing the orifice 330 when the housing door 320 is in the first position.

Referring now to FIGS. 3D and 3E, a modular electrical interface 360 is disposed on the external portion of the base 304. The modular electrical interface 360 facilitates the flow of power from the output of the modular power converter 260 to the electrical contacts 254, 256. In some instances, the modular electrical interface 360 further provides for the bidirectional flow of signals between the charging module 112 and the at least one two-way distribution system controller 114. The modular electrical interface advantageously permits the slideable insertion and removal of the charging module 112 into the bucket 230 without requiring manual connection or coupling of power or signal wiring.

Figure 4:
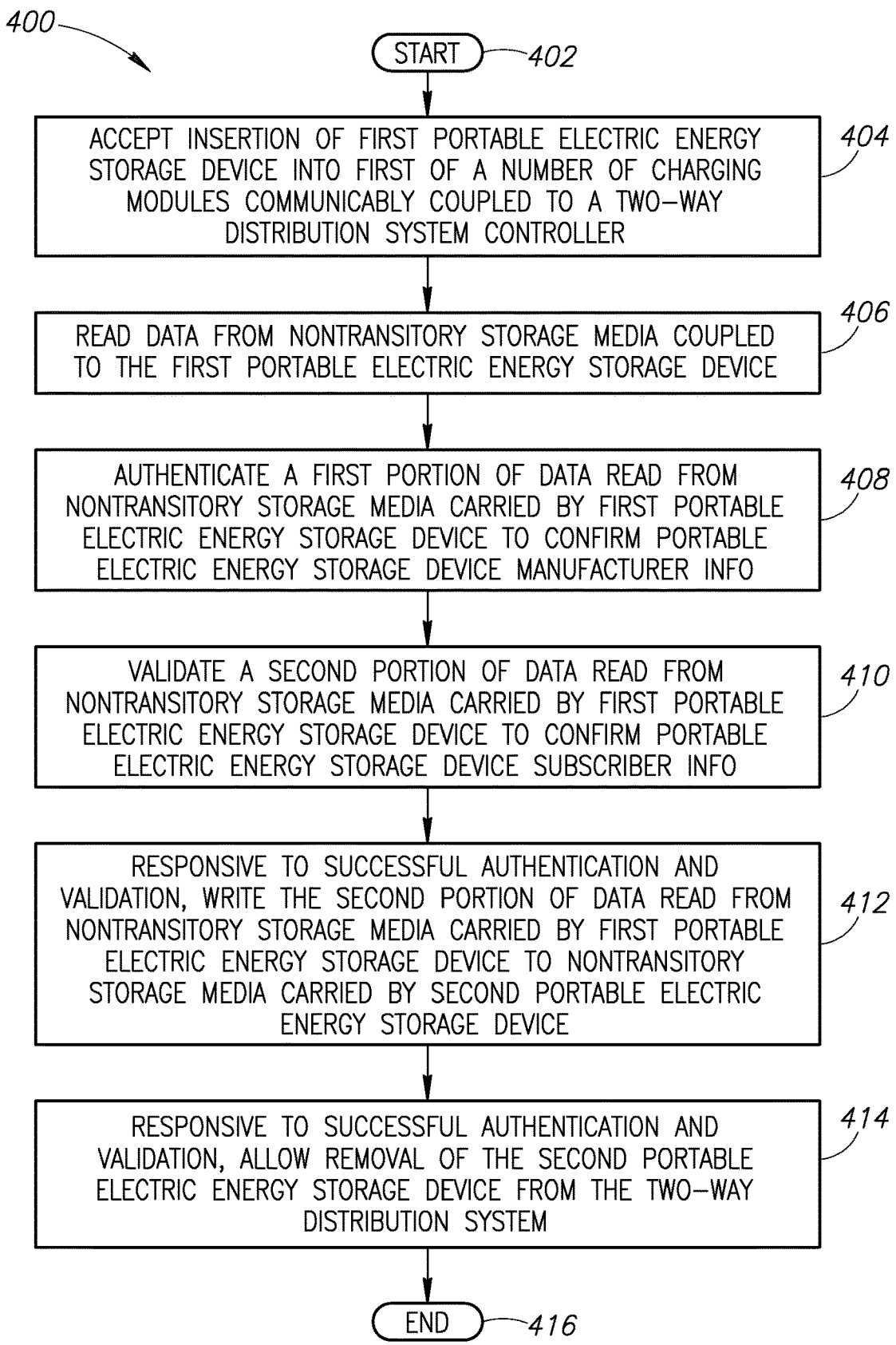
FIG. 4 is a high-level logic flow diagram of an illustrative method of operating a two-way distribution, charging, and vending system for providing portable electric energy storage devices, according to one non-limiting illustrated embodiment.

FIG. 4 shows a high-level flow diagram of an example method 400 of operating a two-way distribution, charging, and vending system 110 for providing portable electric energy storage devices 120, according to one non-limiting illustrated embodiment. A manufacturer of vehicles 140 powered using portable electric energy storage devices 120 may also provide the portable electric energy storage devices 120. The portable electric energy storage devices 120 may also be provided by a party that does not manufacture vehicles but distributes portable electric energy storage devices. For safety and operability reasons, the manufacturer may place tight manufacturing and quality controls on the portable electric energy storage devices 120 to optimize vehicle performance, maximize vehicle life, and/or enhance the safety of the vehicle operator. The manufacturer may elect to improve widespread public acceptance of the electric vehicles by providing two-way distribution, charging, and vending systems 110 at convenient locations throughout a geographic area (e.g., city, county, state, or nation). At these two-way distribution, charging, and vending systems 110, vehicle operators who have subscribed to a portable electric energy storage device exchange program are able to exchange a discharged portable electric energy storage device 120 for a more fully charged portable electric energy storage device 120. By supporting such an exchange, the manufacturer is able to ease public concerns of being stranded and without power in a remote location and thereby increase public acceptance of an ecologically friendly electric vehicle technology. The method 400 of operating a two-way distribution, charging, and vending system 110 for providing portable electric energy storage devices 120 commences at 402.

At 404, a first portable electric energy storage device 120a is at least partially received by a first charging module 112a. For example, a subscriber 130 may remove an at least partially discharged first portable electric energy storage device 120a from a vehicle 140. The subscriber 130 inserts the at least partially discharged first portable electric energy storage device 120a into an empty first charging module 112a in the two-way distribution, charging, and vending system 110.

At 406, the at least one two-way distribution system controller 114 reads data from a nontransitory storage media 122a carried by the at least partially discharged first portable electric energy storage device 120a. In some instances, the at least one two-way distribution system controller 114 wirelessly reads the data from the nontransitory storage media 122a, for example using Near Field Communication, frequency identification (RFID), or Bluetooth®.

At 408, the at least one two-way distribution system controller 114 authenticates a first portion of the data read from the nontransitory storage media 122a carried by the at least partially discharged first portable electric energy storage device 120a to confirm the portable electric energy storage device 120a is authorized by the vehicle manufacturer. In some instances, the first portion of the data may include data stored or otherwise retained in an immutable portion of the nontransitory storage media 122a carried by the portable electric energy storage device 120a. In some instances, the first portion of the data may include a manufacturer identifier that is encrypted, encoded, or otherwise protected.

In some instances, the at least one two-way distribution system controller 114 may locally authenticate the first portion of the data read from the nontransitory storage media 122a carried by the portable electric energy storage device 120a. For example, the at least one two-way distribution system controller 114 may compare all or a portion of the data read from the nontransitory storage media 122a with a known authentic code supplied by the manufacturer and stored in a nontransitory storage media readable by the at least one two-way distribution system controller 114.

In other instances, the at least one two-way distribution system controller 114 may remotely authenticate the first portion of the data read from the nontransitory storage media 122a carried by the portable electric energy storage device 120a. For example, the at least one two-way distribution system controller 114 may communicate at least a portion of the first portion of the data, including the manufacturer identifier, to a back-end system 160. The back-end system 160 can compare the first portion of the data read from the nontransitory storage media 122a with a known authentic manufacturer identifier supplied by the manufacturer and stored in a nontransitory storage media readable by the back-end system 160. The back-end system 160 can then communicate a message to the at least one two-way distribution system controller 114 indicative of the outcome of the authentication of the manufacturer identifier read from the nontransitory storage media 122a.

At 410, the at least one two-way distribution system controller 114 validates a second portion of the data read from the nontransitory storage media 122a carried by the at least partially discharged first portable electric energy storage device 120a to confirm the validity of the subscription of the subscriber 130 returning the portable electric energy storage device 120a. In some instances, the second portion of the data may include data stored or otherwise retained in a rewriteable portion of the nontransitory storage media 122a carried by the portable electric energy storage device 120a. In some instances, the second portion of the data may uniquely identify a particular subscriber 130.

In some instances, the at least one two-way distribution system controller 114 may locally validate subscriber identifier included in the second portion of the data read from the nontransitory storage media 122a carried by the portable electric energy storage device 120a. For example, the at least one two-way distribution system controller 114 may compare all or a portion of subscriber identifier read from the second portion of the nontransitory storage media 122a with entries in a database or data store indicative of all known valid subscriber identifiers. In some instances, the back-end system 160 may communicate all or a portion of the database or data store indicative of all known valid subscriber identifiers to the at least one two-way distribution system controller 114 periodically, intermittently, or from time-to-time. In some implementations, such a database or data store may include data indicative of a "whitelist" (i.e., a list of subscribers having an accounts that are in good standing), a "blacklist" (i.e., a list of subscribers having accounts that are not in good standing), or any combination thereof.

In other instances, the at least one two-way distribution system controller 114 may remotely authenticate the subscriber identifier included in the second portion of data read from the nontransitory storage media 122a. For example, the at least one two-way distribution system controller 114 may communicate at least a portion of the subscriber identifier included in the second portion of the data to the back-end system 160. The back-end system 160 can compare the subscriber identifier with entries in a database or data store indicative of all known valid subscriber identifiers. The back-end system 160 can then communicate a message to the at least one two-way distribution system controller 114 indicative of the outcome of the validation of the subscriber identifier included in the second portion of the data read from the nontransitory storage media 122a.

If the two-way distribution, charging, and vending system 110 determines the subscriber's account is not in good standing, a message may be displayed on the display 116, a handheld device logically associated with the subscriber, or both. The message may require the subscriber 130 to bring their account to a "good standing" condition prior to dispensing a charged portable electric energy storage device 120. In some instances, the subscriber 130 may provide an electronic payment (e.g., credit or debit card) using an input device (e.g., magnetic stripe reader) on the two-way distribution, charging, and vending system 110 or a portable wireless device such as a smartphone. In some instances, the subscriber 130 may authorize the back-end system 160 to debit or charge a previously supplied (i.e., an "on file") debit or credit card to bring the subscriber account to good standing by providing an input to the back-end system 160 via the kiosk or via a portable wireless device such as a smartphone.

Where the two-way distribution, charging, and vending system 110 locally validates subscriber account status, after successfully processing the payment the two-way distribution, charging, and vending system 110 may immediately update subscriber information in the nontransitory storage media to reflect the received payment and the updated account standing. Such updated subscriber account information may be pushed to or pulled by the back end system 160 either immediately or at one or more defined intervals. Where remote validation is used, the back-end system 160 may immediately update subscriber information upon successful completion of payment to reflect the subscriber's revised account standing and may push data indicative of the respective subscriber's account standing to the two-way distribution, charging, and vending system 110. At times, the back-end system 160 and/or the two-way distribution, charging, and vending system 110 may provide messages to a subscriber 130 based on the account status of the respective subscriber 130. For example, a subscriber 130 having an account that is not in good standing may be provided a message via the display device 116 that inquires whether the subscriber would like to change their payment method to an automatic payment method such as a periodic auto-debit payment collected via a deposit account or via a credit or debit card.

The two-way distribution, charging, and vending system 110 may communicate with a portable electric energy storage device 120 and/or the subscriber vehicle 140 prior to dispensing the portable electric energy storage device 120 to a subscriber 130. Such communication may for example, include instructions executable at least in part by a security or other controller carried by the dispensed portable electric energy storage device 120. Such communication may for example, include instructions executable at least in part by one or more controllers carried on or by the subscriber's vehicle 140.

In one implementation, a subscriber 130 logically associated with a subscriber account that is not in good standing may arrive at a two-way distribution, charging, and vending system 110 with a depleted battery only to find that a charged portable electric energy storage device 120 is unavailable due at least in part to the subscriber's account status. Rather than stranding the subscriber 130, in some implementations the at least one two-way distribution system controller 114 can communicate instructions to a charged portable electric energy storage device 120. In some instances, the instructions provided by the at least one two-way distribution system controller 114 may limit the energy discharge rate of the dispensed portable electric energy storage device 120 to a defined value less than a maximum energy discharge rate achievable by the portable electric energy storage device 120. Limiting the energy discharge rate of the portable electric energy storage device 120 effectively limits the speed of the subscriber's vehicle 140 until the subscriber 130 brings their account into good standing.

In another instance, the instructions provided by the at least one two-way distribution system controller 114 may limit or otherwise cap the energy available to the subscriber's vehicle 140. For example, the instructions may limit the energy available from the portable electric energy storage device 120 to a defined percentage of the total energy stored (i.e., the charge) in the portable electric energy storage device 120. For example, a portable electric energy storage device 120 having a stored energy level of 1 kilowatt-hour (kWh) may be limited to 50% availability (i.e., 500 watt-hours) when dispensed to a subscriber associated with a subscriber account that is not in good standing. Portable electric energy storage devices 120 having such energy availability limitations may cease delivering energy to the subscriber's vehicle 140 upon reaching the defined energy availability limit.

In another example, the energy availability cap or limit in a portable electric energy storage device 120 dispensed by the two-way distribution, charging, and vending system 110 may be based on one or more extrinsic factors. At times, the energy availability cap in the portable electric energy storage device 120 may be based in whole or in part on the distance between the two-way distribution, charging, and vending system 110 and a defined geographic point. For example, the two-way distribution, charging, and vending system 110 may dispense a portable electric energy storage device 120 having an energy availability cap sufficient for a subscriber 130 to reach a defined location (e.g., home, work) when the subscriber account logically associated with the respective subscriber 130 is not in good standing. At times, the at least one two-way distribution system controller 114 may additionally or alternatively communicate with a controller carried by the subscriber vehicle 140 when the subscriber account logically associated with a subscriber 130 is not in good standing. At times, such communication may be performed wirelessly between the two-way distribution, charging, and vending system 110 and the subscriber vehicle 140. At other times, such communication may be performed via one or more intermediary devices exchanged between the two-way distribution, charging, and vending system 110 and the subscriber vehicle 140, for example via the nontransitory storage media 122 carried by a portable electric energy storage device 120 discharged by the two-way distribution, charging, and vending system 110. The communication between the at least one two-way distribution system controller 114 and the subscriber vehicle 140 may limit or alter the performance of one or more vehicular systems while the subscriber account logically associated with the subscriber 130 is not in good standing. In one implementation, such communication may cause one or more vehicular systems (e.g., lights, horn) to act erratically or spontaneously as a way of indicating the subscriber account logically associated with the subscriber 130 is not in good standing. Such altered vehicular systems may be maintained in an altered state for a defined period, for example until the subscriber account is brought into good standing.

Importantly, the authentication and validation processes are unrelated. The authentication at 408 ensures the portable electric energy storage device 120a is a manufacturer approved device by comparing a manufacturer identifier stored in the first portion of the nontransitory storage media 122a carried by the portable electric energy storage device 120a. The validation at 410 ensures the subscription logically associated with the subscriber identifier carried in the nontransitory storage media 122a of the inserted portable electric energy storage device 120a is valid. Additionally, the validation at 410 provides the two-way distribution, charging, and vending system 110 with guidance on the number, type, and performance of charged portable electric energy storage devices 120b-120n to dispense to the subscriber based on the subscription logically associated with the subscriber identifier.

At 412, responsive to a successful authentication at 408 and a successful validation at 410, the two-way distribution, charging, and vending system 110 writes the second portion of data, including the subscriber identifier, read from the first portable electric energy storage device 120a to a nontransitory storage media 122b carried by a second, charged, portable electric energy storage device 120b. Recall, the manufacturer specific identifier is stored or retained in an immutable or non-rewriteable first portion of the nontransitory storage media 122b carried by the charged portable electric energy storage device 120b. Thus, after writing the subscriber identifier in the second portion of the nontransitory storage media 122b, the first portion of the nontransitory storage media 122b will include data indicative of the manufacturer identifier and the second portion of the nontransitory storage media 122b will include data indicative of the subscriber identifier.

At 414, responsive to successfully authenticating the manufacturer identifier at 408 and validating the subscriber identifier at 410, the at least one two-way distribution system controller 114 allows the removal of the charged portable electric energy storage device 120b from the two-way distribution, charging, and vending system 110. The method 400 of operating a two-way distribution, charging, and vending system 110 for providing portable electric energy storage devices 120 commences at 402.

Figure 5:
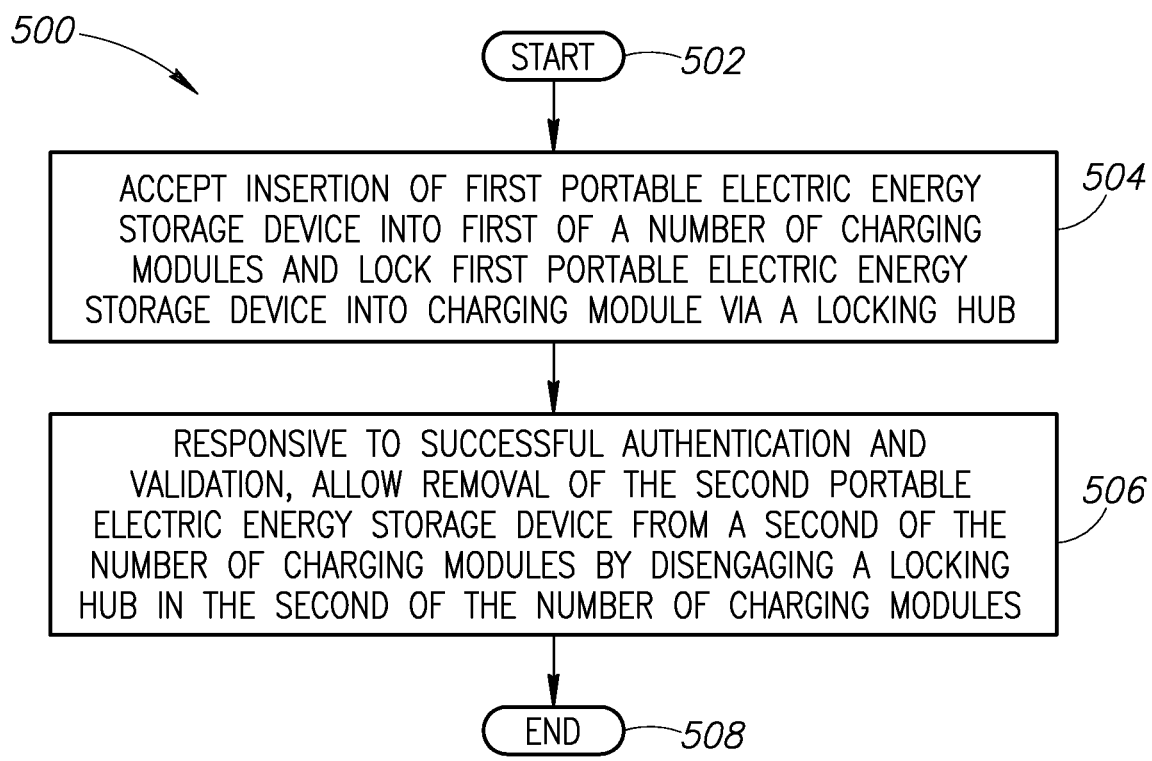
FIG. 5 is a high-level logic flow diagram of an illustrative method of managing a two-way distribution of portable electric energy storage devices from a two-way distribution, charging, and vending system, according to one non-limiting illustrated embodiment.

FIG. 5 shows a high-level flow diagram of an example method 500 of operating a two-way distribution, charging, and vending system 110 for providing portable electric energy storage devices 120, according to one non-limiting illustrated embodiment. The locking hub 252 locks the portable electric energy storage device 120 into the charging module 112. In some instances, the locking hub 252 is biased towards a first (locked) position and the bias may be overcome by the insertion of the portable electric energy storage device 120 into the charging module 112. In such instances, the portable electric energy storage device 120 is locked in the charging module 112 upon insertion. In other instances, the locking hub is biased towards a second (unlocked) position and thus may permit the removal of the portable electric energy storage device 120 from the charging module 112 until such time that the locking hub 252 is rotated to the first (locked) position. The method 500 of locking the at least partially discharged first portable electric energy storage device 120a into the first charging module 112a upon insertion and unlocking the charge second portable electric energy storage device 120b from a second charging module 112b upon successful authentication of the manufacturer identifier and validation of the subscriber identifier commences at 502.

At 504, the first of a number of charging modules 112a receives the first portable electric energy storage device 120. As the first portable electric energy storage device 120 is inserted into the first charging module 112a, the locking hub 252 in the first charging module 112a engages the cavities 242 on the first portable electric energy storage device 120a, securely locking the first portable electric energy storage device 120 into the first charging module 112a.

In some instances, the locking hub 252 is biased toward the first (locked) position using one or more biasing members such as a helical coil spring or similar. In such instances, inserting the first portable electric energy storage device 120a causes a temporary rotational displacement of the locking hub 252 from the first position until the first portable electric energy storage device 120a is seated in the charging module 112 and the locking hub rotationally biases back to the first (locked) position.

In other instances, the actuator 340 causes the rotational displacement of the locking hub 252 from the first (locked) position to the second (unlocked) position until the first portable electric energy storage device 120a is seated in the first charging module 112a. After the first portable electric energy storage device 120a is seated in the first charging module 112a, the actuator can cause the rotational displacement of the locking hub 252 from the second (unlocked) position to the first (locked) position thereby securing the first portable electric energy storage device 120a in the first charging module 112a.

After securing the first portable electric energy storage device 120a in the first charging module 112a, the at least one two-way distribution system controller 114 authenticates the manufacturer identifier and validates the subscriber identifier stored or otherwise retained in the nontransitory storage media 122a carried by the first portable electric energy storage device 120a.

At 506, responsive to the successful authentication of the manufacturer identifier and successful validation of the subscriber identifier stored or otherwise retained in the nontransitory storage media 122a carried by the first portable electric energy storage device 120a, the at least one two-way distribution system controller 114 writes the subscriber identifier to the nontransitory storage media 122b carried by a charged second portable electric energy storage device 120b in a second of the number of charging modules 112b. The at least one two-way distribution system controller 114 then causes the rotational displacement of the locking hub in the second charging module 112b from the first (locked) position to the second (unlocked) position thereby permitting the removal of the second portable electric energy storage device 120b from the second charging module 112b. The method 500 of locking the at least partially discharged first portable electric energy storage device 120a into the first charging module 112a upon insertion and unlocking the charge second portable electric energy storage device 120b from a second charging module 112b upon successful authentication of the manufacturer identifier and validation of the subscriber identifier concludes at 508.

Figure 6:
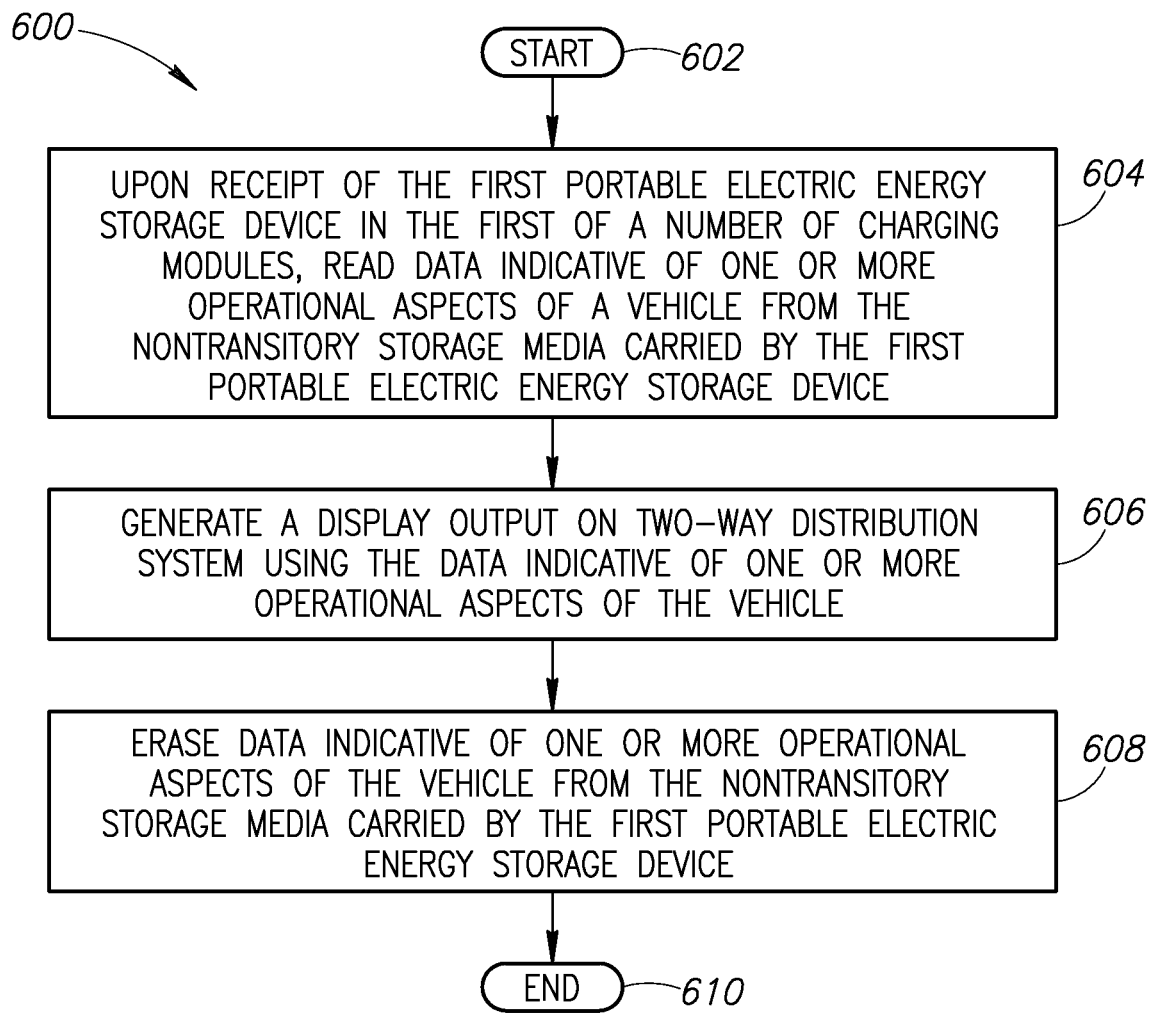
FIG. 6 is a high-level logic flow diagram of an illustrative method of displaying vehicle specific information retrieved from a nontransitory storage media carried by a portable electric energy storage device that is used in an exchange process at a two-way distribution, charging, and vending system, according to one non-limiting illustrated embodiment.

FIG. 6 shows a high-level flow diagram of an example method 600 of a two-way distribution, charging, and vending system 110 providing a subscriber 130 with vehicle specific information upon receipt of a portable electric energy storage device 120 from the subscriber 130, according to one non-limiting illustrated embodiment. In some implementations, the nontransitory storage media 122 carried by a portable electric energy storage device 120 may store information in the form of data indicative of one or more operational aspects of the vehicle 140 in which the portable electric energy storage device 120 has been most recently used. Such data may include, but is not limited to maintenance information, service information, operational information, and similar. The vehicle specific information may be presented to the subscriber 130 via the user interface 116 in an audio, a video, or an audio/visual format. The method 600 of a two-way distribution, charging, and vending system 110 providing a subscriber 130 with vehicle specific information upon receipt of a portable electric energy storage device 120 from the subscriber 130 commences at 602.

At 604, in response to receiving the first discharged portable electric energy storage device 120a in the first of a number of charging modules 112a, the at least one two-way distribution system controller 114 reads data from the nontransitory storage media 122a carried by the portable electric energy storage device 120a. In some instances, in addition to the manufacturer identifier and the subscriber identifier, the nontransitory storage media 122a may contain vehicle specific information in the form of data indicative of one or more operational aspects of the subscriber's vehicle 140 from which the portable electric energy storage device 120a was most recently removed. Such vehicle specific information may include, but is not limited to information regarding current maintenance, service, repairs, or replacements due on the vehicle; vehicle recall information; future expected maintenance, service, repairs, or replacements due on the vehicle based on observed driving conditions and driving styles; and similar.

At 606, in response to obtaining the vehicle specific information, the at least one two-way distribution system controller 114 generates an output perceptible by the subscriber 130. Such an output may include information presented in an audio format, a video format, a still image format, and/or an audio/visual format. For example, the at least one two-way distribution system controller 114 may generate a video format display on the user interface 116 in response to vehicle data retrieved from the nontransitory storage media 122a carried by the portable electric energy storage device 120a.

At 608, the at least one two-way distribution system controller 114 erases the vehicle specific data from the nontransitory storage media 122a carried by the portable electric energy storage device 120a. The method 600 of a two-way distribution, charging, and vending system 110 providing a subscriber 130 with vehicle specific information upon receipt of a portable electric energy storage device 120 from the subscriber 130 concludes at 610.

Figure 7:
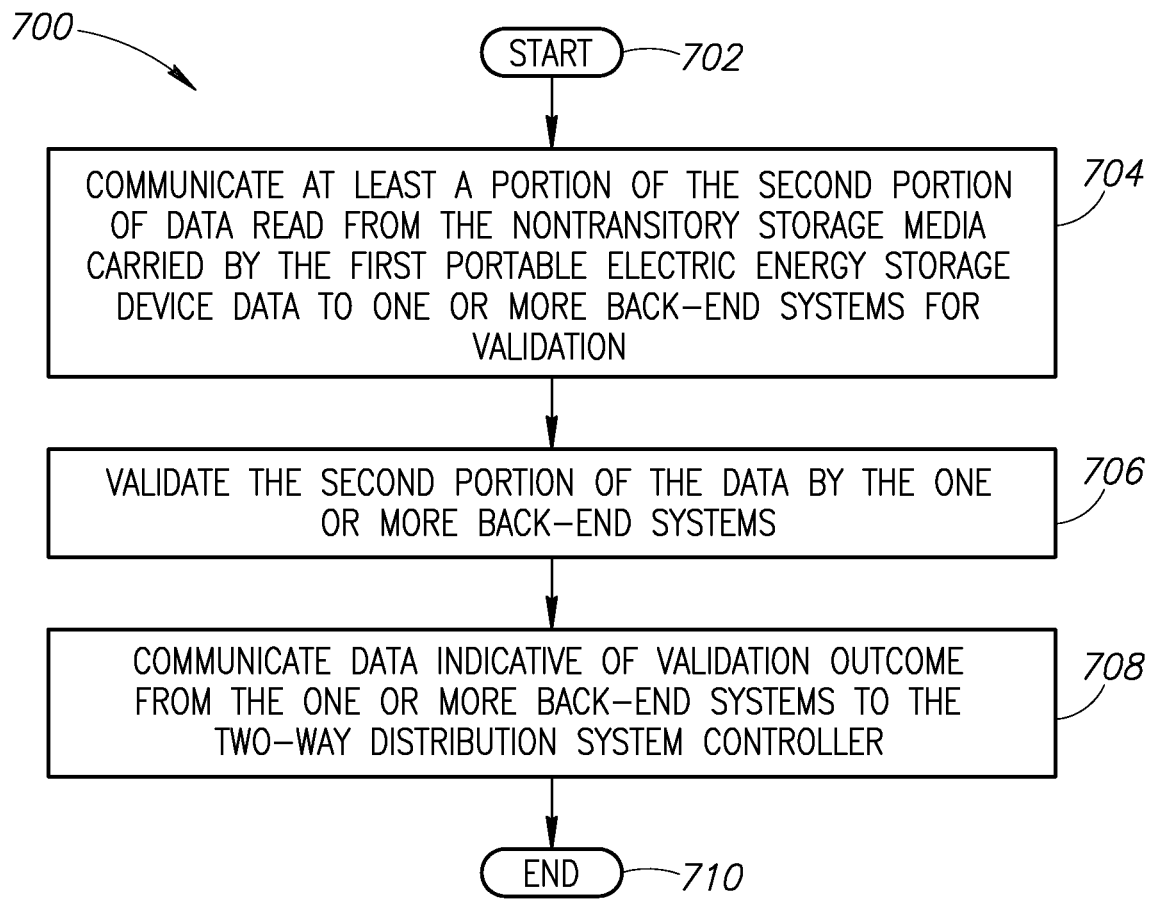
FIG. 7 is a high-level logic flow diagram of an illustrative method of validating a subscriber identifier using one or more back-end systems communicably coupled to the two-way distribution, charging, and vending system, according to one non-limiting illustrated embodiment.

FIG. 7 shows a high-level flow diagram of an example method of verifying a subscriber identifier read by the at least one two-way distribution system controller 114 from the second portion of the nontransitory storage media 122a carried by a first portable electric energy storage device 120a, according to one illustrated embodiment. Vehicle manufacturers may offer exchange portable electric energy storage devices 120 via subscription plans that may include one or multiple levels. For example, subscription plans may be in the form of a limited number of exchanges over a given timeframe (one exchange per day, five exchanges per week, thirty exchanges per month, etc.).

In another example, subscription plans may be in the form of a number of portable electric energy storage devices 120 made available to the subscriber at one time. Certain vehicles 140 may have the capability to use more than one portable electric energy storage device 120 at a time—in such instances, the subscriber will likely desire to exchange the portable electric energy storage devices in pairs rather than individually.

In another example, subscription plans may be in the form of vehicle performance (a "range" plan, a "performance" plan, etc.). In such instances, different portable electric energy storage devices 120 may have different discharge characteristics tailored to a particular subscription plan.

Thus, upon receipt of a portable electric energy storage device 120, the at least one two-way distribution system controller 114 retrieves the subscriber identifier from the nontransitory storage media 122a carried by the portable electric energy storage device 120a. Using the retrieved subscriber identifier, the at least one two-way distribution system controller 114 can both validate the subscriber account (i.e., the account is current on payment) and confirm any special subscription services and/or subscription level. The method of verifying a subscriber identifier read by the at least one two-way distribution system controller 114 from the second portion of the nontransitory storage media 122a carried by a first portable electric energy storage device 120a commences at 702.

At 704, the at least one two-way distribution system controller 114 communicates the subscriber identifier read from the second portion of the nontransitory storage media 122a carried by the portable electric energy storage device 120a to a back-end system 160. The data may be communicated by or across any number or type of networks including plain old telephone service (POTS) wired connections, wireless networks, wired networks, the Internet, or combinations thereof. In some instances, the subscriber identifier may be communicated in an encrypted or otherwise protected format.

At 706, the back-end system 160 validates the subscriber identifier provided by the at least one two-way distribution system controller 114. In some instances, the back-end system 160 performs such a validation by decrypting (if needed) and comparing the subscriber identifier provided by the at least one two-way distribution system controller 114 with a list of known valid subscriber identifiers. The list of known valid subscriber identifiers may be stored, retained, or otherwise maintained in a data store or database on one or more back-end system readable nontransitory storage media.

Optionally, the back-end system 160 may look-up or otherwise determine the subscription plan logically associated with the received subscriber identifier. In some instances, the subscription plan information may be stored, retained, or otherwise maintained along with the valid subscriber identifiers in a data store or database on one or more back-end system readable nontransitory storage media.

At 708, the back-end system 160 communicates data indicative of the success or failure of the subscriber identity validation to the at least one two-way distribution system controller 114. The data indicative of the success or failure of the subscriber identity validation includes at least an indicator of the validity of the subscription logically associated with the subscriber identifier read from the portable electric energy storage device 120a. At times, the data indicative of the success or failure of the subscriber identity validation may include an indication of the number of charged portable electric energy storage devices 120 the at least one two-way distribution system controller 114 should release to the subscriber. At times, the data indicative of the success or failure of the subscriber identity validation may include an indication of the type, style, or operational parameters of the charged portable electric energy storage devices 120 the at least one two-way distribution system controller 114 should release to the subscriber. The method of verifying a subscriber identifier read by the at least one two-way distribution system controller 114 from the second portion of the nontransitory storage media 122a carried by a first portable electric energy storage device 120a concludes at 710.

Figure 8:
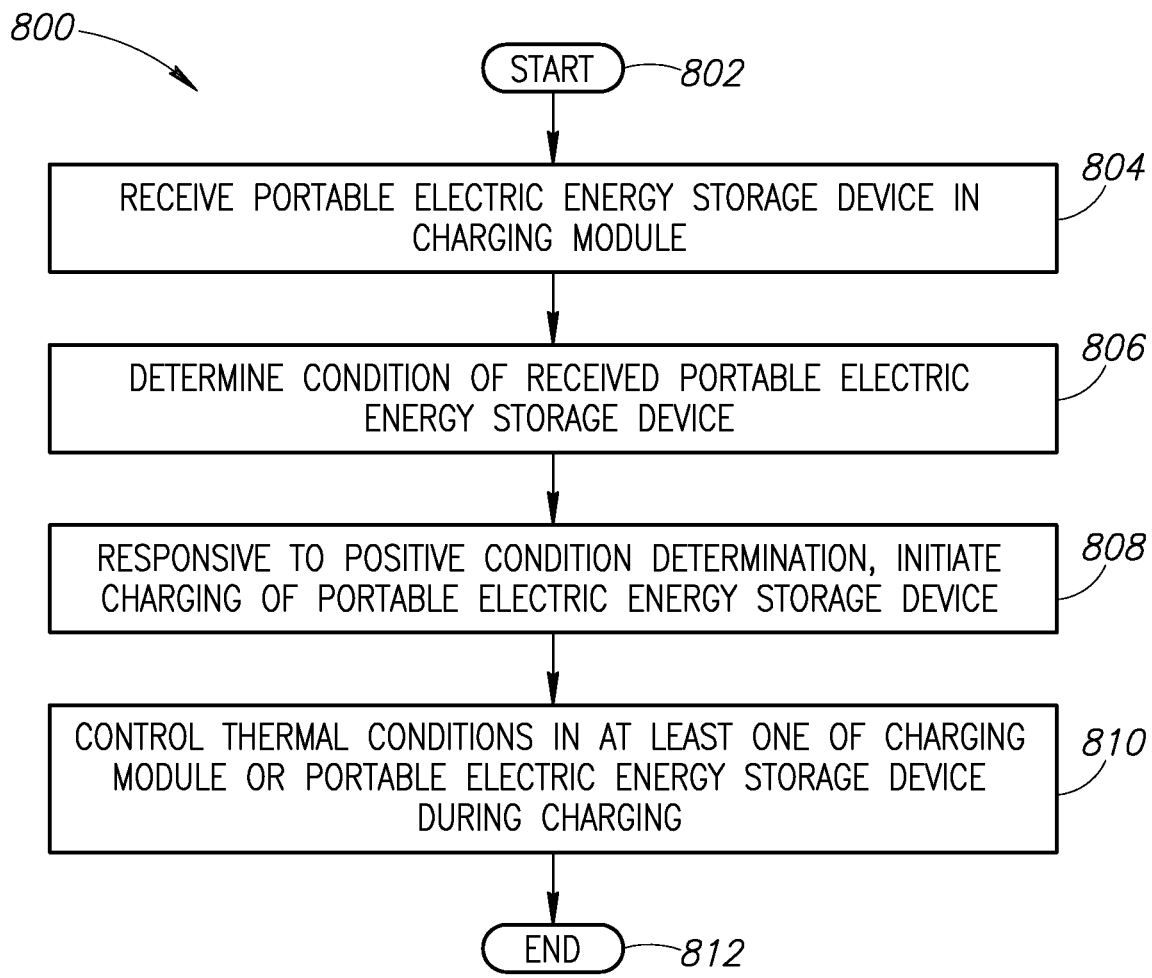
FIG. 8 is a high-level logic flow diagram of an illustrative method of charging a first portable electric energy storage device received by a two-way distribution, charging, and vending system, according to one non-limiting illustrated embodiment.

FIG. 8 shows a high-level flow diagram of an example method of assessing a received at least partially discharged portable electric energy storage device 120a and charging the portable electric energy storage device 120a under controlled thermal conditions, according to one illustrated embodiment. The at least partially discharged portable electric energy storage device 120a inserted into a first of the number of charging modules 112a may contain one or more faults that compromise the charge storage capacity or safety of the portable electric energy storage device 120a. To avoid potential failure of the portable electric energy storage device 120a during charging, after receiving and prior to charging the portable electric energy storage device 120a, the at least one two-way distribution system controller 114 may determine the condition of the portable electric energy storage device 120a. Responsive to determining the condition of the portable electric energy storage device 120 is acceptable for charging, the at least one two-way distribution system controller 114 can initiate charging of the portable electric energy storage device 120a. The at least one two-way distribution system controller 114 can control one or more charging conditions within a defined range during the charging process. The at least one two-way distribution system controller 114 can maintain and/or control conditions within the charging module 112, the portable electric energy storage device 120a, or both. The method of assessing a received at least partially discharged portable electric energy storage device 120a and charging the portable electric energy storage device 120a under controlled thermal conditions commences at 802.

At 804, the at least partially discharged portable electric energy storage device 120a is received in the first of a number of charging modules 112a.

At 806, responsive to the receipt of the first portable electric energy storage device 120a in the first charging module 112a, the at least one two-way distribution system controller 114 assesses the condition of the received portable electric energy storage device 120a. Such an assessment may consider the electrical charge storage capacity of the portable electric energy storage device 120a, the presence of internal or external electrical faults (e.g., shorts or opens) in the portable electric energy storage device 120a, the number of charge cycles on the portable electric energy storage device 120a, and the like.

In some instances, the at least one two-way distribution system controller 114 compares the assessed condition of the portable electric energy storage device 120a with defined, stored, acceptable values and/or value ranges to determine the suitability of the portable electric energy storage device 120a for charging. If the assessed condition falls outside of acceptable range, the at least one two-way distribution system controller 114 can isolate the first charging module 112a. Optionally, the at least one two-way distribution system controller 114 can communicate a message that includes data indicative of the failed portable electric energy storage device 120a to a back-end system 160. Such data may include the identity of the portable electric energy storage device 120a and the assessment results, including an indication of the failed assessment parameters.

At 808, responsive to a successful assessment of the condition of the portable electric energy storage device

120a, the at least one two-way distribution system controller 114 initiates charging of the portable electric energy storage device 120a.

At 810, contemporaneous with charging the portable electric energy storage device 120a, the at least one two-way distribution system controller 114 controls or maintains one or more charging conditions within a defined range during the charging process. In some instances, the conditions may be maintained or controlled via changes to the charging module (e.g., limiting current flow to the portable electric energy storage device 120a). In some instances, the conditions may be alternatively or additionally maintained or controlled by altering conditions within the two-way distribution, charging, and vending system 110 (e.g., heating, cooling, and/or dehumidifying all or a portion of the interior of the interior of the two-way distribution, charging, and vending system 110). In some instances, the conditions may be alternatively or additionally maintained or controlled by altering conditions within the portable electric energy storage device 120a (e.g., through the use of one or more phase change heat-transfer materials within the portable electric energy storage device 120a).

At times, the environmental conditions within the two-way distribution, charging, and vending system 110, the charging module 112, the portable electric energy storage device 120, or combinations thereof may be controlled to optimize one or more operational aspects such as rapidity of recharge, portable electric energy storage device life, portable electric energy storage device condition, or combinations thereof.

For example, the at least one two-way distribution system controller 114 maintains the temperature of a freshly inserted, at least partially discharged portable electric energy storage device 120 above a defined first temperature for a first interval to increase the initial charging rate. After the first interval expires, the at least one two-way distribution system controller 114 decreases the temperature of the at least partially discharged portable electric energy storage device 120 below a defined second temperature for the remaining duration of the charging period to maximize the lifecycle of the portable electric energy storage device 120.

The method of assessing a received at least partially discharged portable electric energy storage device 120a and charging the portable electric energy storage device 120a under controlled thermal conditions concludes at 812.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011; U.S. provisional patent application Ser. No. 61/783,041, entitled "APPARATUS, SYSTEM, AND METHOD FOR AUTHENTICATION OF VEHICULAR COMPONENTS" and filed Mar. 14, 2013; and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a portable electrical energy storage device charging and distribution system, the method comprising:
    receiving, by a first charging module of the system, a first portable electrical energy storage device;
    retrieving, by a controller of the system, data from one or more non-transitory storage media carried by the first portable electrical energy storage device;
    authenticating, by the controller, the first portable electrical energy storage device by comparing a first portion of the data with a manufacturer identifier;
    validating, by the controller, a subscription plan based on a second portion of the data; and
    responsive to successfully authenticating the first portable electrical energy storage device and responsive to successfully validating the subscription plan, storing, by the controller, the second portion of the data in a second portable electrical energy storage device positioned in a second charging module of the system.

2. The method of claim 1, further comprising:
    enabling the second portable electrical energy storage device to be removed from the second charging module.

3. The method of claim 1, wherein the first portion of the data includes a manufacturer identifier.

4. The method of claim 1, wherein the second portion of the data includes a subscriber identifier.

5. The method of claim 1, further comprising:
    responsive to unsuccessfully authenticating the first portion of the data, operating a first locking hub of the first charging module to lock the first portable electric energy storage device in the first charging module.

6. The method of claim 5, further comprising:
    rotatably displacing the first locking hub of the first charging module from a locked position to receive the first portable electrical energy storage device; and
    rotatably returning the first locking hub to the locked position via one or more biasing members to lock the first portable electric energy storage device in the first charging module.

7. The method of claim 6, further comprising:
    after storing the second portion of the data in the second portable electrical energy storage device positioned in the second charging module of the system, operating a second locking hub of the second charging module to unlock the second portable electric energy storage device in the second charging module.

8. The method of claim 7, further comprising:
    rotatably displacing the second locking hub of the second charging module from a locked position to an unlocked position to unlock the second portable electric energy storage device in the second charging module.

9. The method of claim 8, further comprising:
    displacing an actuator from a first position to a second position so as to displace the second locking hub from the locked position to the unlocked position.

10. The method of claim 1, further comprising:
    erasing data indicative of one or more operational aspects of an external device powered by the first portable electrical energy storage device from the one or more non-transitory storage media carried by the first portable electrical energy storage device.

11. The method of claim 10, further comprising:
    erasing the data indicative of the one or more operational aspects of the external device via a communications interface communicably coupled to the controller.

12. The method of claim 1, wherein validating the subscription plan based on the second portion of the data comprises:
    transmitting the second portion of the data to a back-end system; and
    receiving a confirmation from the back-end system regarding validity of the subscription plan.

13. The method of claim 1, further comprising:
    responsive to unsuccessfully validating the second portion of the data, causing a display on a display device communicably coupled to the controller, data indicative of the unsuccessful validation;
    generating a request for a subscriber to perform one or more actions to restore the subscription plan; and
    responsive to receipt of data indicative that the subscription plan is restored, enabling the second portable electrical energy storage device to be removed from the second charging module.

14. A portable electrical energy storage device charging and distribution system, the system comprises:
    a controller;
    a first charging module coupled to the controller and configured to receive and charge a first portable electrical energy storage device; and
    a second charging module coupled to the controller and configured to receive and charge a second portable electrical energy storage device;
    wherein the controller is configured to:
        retrieve data from one or more non-transitory storage media carried by the first portable electrical energy storage device;
        authenticate the first portable electrical energy storage device by comparing a first portion of the data with a manufacturer identifier;
        validate a subscription plan based on a second portion of the data; and
        responsive to successfully authenticating the first portable electrical energy storage device and responsive to successfully validating the subscription plan, store the second portion of the data in a second portable electrical energy storage device positioned in a second charging module of the system.

15. The system of claim 14, wherein the controller is further configured to:
enable the second portable electrical energy storage device to be removed from the second charging module.

16. The system of claim 14, wherein the first and second charging modules are two of a plurality of charging modules of the system, and wherein each of the charging modules comprises:
a housing configured to receive a portable electrical energy storage device; and
a housing door axially displaceable along a longitudinal axis of the housing from a first position proximate an entrance of the housing to a second position proximate a base of the housing.

17. The system of claim 16, wherein the housing door includes an aperture configured to enable the portable electrical energy storage device to electrically couple to an electric contact projecting from the base of the housing.

18. The system of claim 17, wherein each of the charging modules comprises:
a displaceable cover operably coupled to the housing door and to the housing such that as the housing door is displaced from the first position to the second position, the displaceable cover is displaced from a closed position to an open position.

19. The system of claim 14, wherein the first portable electrical energy storage device is received in an interior space defined by a housing of the first charging module, and wherein the first charging module includes a housing door axially displaceable along a longitudinal axis of the housing from a first position proximate an entrance of the housing to a second position proximate a base of the housing.

20. The system of claim 19, wherein the first portable electrical energy storage device is electrically coupled to an electric contact projecting from the base of the housing and passing through an aperture in the housing door.

* * * * *